US009483240B1

(12) United States Patent
Boyar et al.

(10) Patent No.: US 9,483,240 B1
(45) Date of Patent: Nov. 1, 2016

(54) DATA BINDING DEPENDENCY ANALYSIS

(71) Applicant: Google Inc., Mountain View, CA (US)

(72) Inventors: Yiğit Boyar, San Francisco, CA (US); George Francis Mount, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/753,543

(22) Filed: Jun. 29, 2015

Related U.S. Application Data

(60) Provisional application No. 62/166,765, filed on May 27, 2015.

(51) Int. Cl.
*G06F 9/44* (2006.01)
*G06F 9/45* (2006.01)

(52) U.S. Cl.
CPC .. *G06F 8/38* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 6,330,006 B1 * | 12/2001 | Goodisman | G06F 9/4443 715/762 |
| 6,571,253 B1 * | 5/2003 | Thompson | G06F 17/30905 |
| 7,117,504 B2 * | 10/2006 | Smith | G06F 8/20 709/201 |
| 7,149,752 B2 | 12/2006 | Mangan | |
| 7,281,018 B1 * | 10/2007 | Begun | G06F 17/218 |
| 7,379,943 B2 | 5/2008 | Paulus et al. | |
| 7,437,374 B2 | 10/2008 | Chen et al. | |
| 7,475,384 B2 | 1/2009 | Heath et al. | |
| 7,493,603 B2 | 2/2009 | Fuh et al. | |
| 7,640,495 B2 | 12/2009 | Ballinger et al. | |
| 7,650,276 B2 | 1/2010 | O'Neil et al. | |
| 7,653,880 B2 | 1/2010 | Peters et al. | |
| 7,873,668 B2 | 1/2011 | Carlson et al. | |
| 7,890,479 B2 | 2/2011 | Chen et al. | |
| 8,229,976 B2 | 7/2012 | Burns | |
| 8,245,210 B2 | 8/2012 | Ng et al. | |
| 8,464,233 B2 | 6/2013 | Wischik et al. | |
| 8,719,773 B2 | 5/2014 | Slone et al. | |
| 2003/0163603 A1 | 8/2003 | Fry et al. | |
| 2005/0114361 A1 * | 5/2005 | Roberts | G06F 8/38 |

(Continued)

OTHER PUBLICATIONS

NPL-Beaudoux-2011, Author: Beaudoux et al., Title "Specifying and Implementing UI Data Bindings with Active Operations", EICS'11, Jun. 13-16, 2011, Pisa, Italy.*

(Continued)

*Primary Examiner* — Qing Chen
*Assistant Examiner* — Hossain Morshed
(74) *Attorney, Agent, or Firm* — Shumaker & Sieffert, P.A.

(57) ABSTRACT

A computing device is described that includes a preprocessor module, and a compiler module. The preprocessor module identifies, based on parsing source code of a layout file that defines a user interface, a plurality of data binding expressions that each define a respective data binding between a user interface element of the user interface and a model object, determine, based on the plurality of data binding expressions, dependencies between each of the plurality of data binding expressions, and generate, based on the dependencies, additional source code for updating at least one respective data binding defined by the plurality of data binding expressions in response to a change to a property of the model object. The compiler module generates an application comprising machine-executable code that is based on the source code of the layout file, the model object, and the additional source code.

20 Claims, 12 Drawing Sheets

(56) References Cited

U.S. PATENT DOCUMENTS

| | | | | |
|---|---|---|---|---|
| 2006/0143592 | A1* | 6/2006 | Bender | G06F 8/20 717/104 |
| 2006/0259870 | A1* | 11/2006 | Hewitt | G06F 9/4443 715/762 |
| 2007/0113221 | A1 | 5/2007 | Liu et al. | |
| 2009/0112915 | A1* | 4/2009 | Lele | G06F 17/30286 |
| 2011/0090236 | A1* | 4/2011 | Calsyn | G06F 9/4443 345/581 |
| 2011/0225488 | A1* | 9/2011 | Schluter | G06F 8/51 715/239 |
| 2013/0055296 | A1* | 2/2013 | Tierney | G06F 9/54 719/331 |

OTHER PUBLICATIONS

Boud et al., "Dependence Analysis," Mar. 25, 2015, Retreived from <http://en.wikipedia.org/wiki/Dependence%20analysis?oldid=653466967> 3 pp.

Android Developers, "Build System Overview" Android, Retrieved from the Internet <https://developer.android.com/sdk/installing/studio-build.html> May 19, 2015, 3 pp.

"Understanding the Android Build Process", a lithe madness [online]. Jun. 7, 2010. Retrieved from the Internet: <http://www.alittlemadness.com/2010/06/07/understanding-the-android-build-process/> 8 pgs.

Kratz et al., "AIDE—Android Integrated Development Environment", Presentation from Slide Share [online]. Feb. 20, 2014. Retrieved from the Internet: <http://www.slideshare.net/bemyapp/aide31441051> 20 pgs.

Reddy, "Android Application Build Process or Compilation Process", C# Corner [online]. Jan. 15, 2014. Retrieved from the Internet: <http://www.c-sharpcorner.com/UploadFile/34ef56/android-application-build-process-or-compilation-process/> 3 pgs.

"Android Build Process", Google Inc. [online]. First Access on May 19, 2015. Retrieved from the Internet: <http://tools.android.com/tech-docs/new-build-system/build-workflow> 1 pg.

"Android Development Book", Android Review [online]. Mar. 29, 2015. Retrieved from the Internet: <http://smartandroidblog.com/androiddevelopmentbook/> 9 pgs.

Vzasadnyy, "Issue: non-Java resources from jar libraries are not included in final apk", unity [online]. Feb. 18, 2015. Retrieved from the Internet: <http://forum.unity3d.com/threads/issue-non-java-resources-from-jar-libraries-are-not-included-in-final-apk.298921/> 4 pgs.

Karim, "Android Application Development—Lecture 2(B): Android Internals: A Quick Overview", Presentation from Slide Share [online]. Feb. 9, 2014. Retrieved from the Internet: <http://www.slideshare.net/androidstream/lecture-2b-android-internals-a-quick-overview> 21 pgs.

Lochan, "Instrumenting android apps: Reverse engineering and injecting code", Presentation from Slides [online]. Oct. 22, 2013. Retrieved from the Internet: <http://slides.com/gauravlochan-1/understand-android-better-through-reverse-engineering#/> 2 pgs.

U.S. Appl. No. 14/834,025, filed by George Francis Mount on Aug. 24, 2015.

International Search Report and Written Opinion from International Application No. PCT/US2016/027093, mailed Jul. 12, 2016 12 pgs.

Dyer et al., "Nu: a Dynamic Aspect-Oriented Intermediate Language Model and Virtual Machine for Flexible Runtime Adaptation," Proceedings of the 7th International Conference on Aspect-Oriented Software Development, Mar. 31, 2008, XP007911524, pp. 191-202.

Cerny et al., "Aspect-driven, Data-reflective and Context-aware User Interfaces Design," ACM Sigapp Applied Computing Review, vol. 13, No. 4, Dec. 1, 2013, XP058045461, pp. 56-66.

* cited by examiner

```
<data>
  <variable name="user" type="com.example.User"/>
</data>
<TextView platform:id="@+id/name_view" platform:text="@{user.name}"/>
<TextView platform:id="@+id/name_and_age_view" platform:text="@{user.name + " " + user.age}"/>
<NumberView platform:id="@+id/total_age_view" platform:value="@{user.friend.age + user.age}"/>
```

FIG. 4A

| | |
|---|---|
| user.name | expression → expression . name; expression → identifier → user |
| user.name + " " + user.age | expression → expression + expression; left: expression + expression (expression . name (identifier → user), literal → stringLiteral " "); right: expression . age (identifier → user) |
| user.friend.age + user.age | expression → expression + expression; left: expression . age (expression . friend (identifier → user)); right: expression . age (identifier → user) |

FIG. 4B

| Expressions | When it is invalid | When it should be evaluated |
|---|---|---|
| 1) user | if user[1] is invalid | If user.name binding expression or<br>user.name + " " + user.age or<br>user.friend.age + user.age binding expression is invalid |
| 2) user.name | If user[1] or .name[2] is invalid | If user.name binding expression or<br>user.name + " " + user.age binding expression is invalid |
| 3) " " | never | If user.name + " " + user.age binding expression is invalid |
| 4) user.name + " " | if user[1] or .name[2] is invalid | If user.name + " " + user.age binding expression is invalid |
| 5) user.age | if user[1] or .age[5] is invalid | If user.name + " " + user.age binding expression is invalid or<br>user.friend.age + user.age binding expression is invalid |
| 6) user.name + " " + user.age | If user[1] or .name[2] or .age[5] is invalid | If user.name + " " + user.age binding expression is invalid |
| 7) user.friend | if user[1] or .friend[7] is invalid | If user.friend.age + user.age binding expression is invalid |
| 8) user.friend.age | if user[1] or .friend[7] or .friend.age[8] is invalid | If user.friend.age + user.age binding expression is invalid |
| 9) user.friend.age + user.age | if user[1] or .friend[7] or .age[5] or .friend.age[8] is invalid | If user.friend.age + user.age binding expression is invalid |

FIG. 4C

| Expressions | When it is invalid | When it should be evaluated |
|---|---|---|
| 1) user | 0b100001 | 0b111111 |
| 2) user.name | 0b100101 | 0b101101 |
| 3) " " | 0b100000 | 0b100111 |
| 4) user.name + " " | 0b100101 | 0b101101 |
| 5) user.age | 0b101001 | 0b111111 |
| 6) user.name + " " + user.age | 0b101101 | 0b101101 |
| 7) user.friend | 0b100011 | 0b111011 |
| 8) user.friend.age | 0b110011 | 0b111011 |
| 9) user.friend.age + user.age | 0b111011 | 0b111011 |

FIG. 4D

```
if ((dirtyFlags & 0b101101L) != 0) {
  // evaluate user.name
  // evaluate user.name + " "
}
if ((dirtyFlags & 0b111011L) != 0) {
  // evaluate user.friend
  // evaluate user.friend.age
} if ((dirtyFlags & 0b101101L) != 0) {
  // evaluate user.name + " " + user.age
}
if ((dirtyFlags & 0b111011L) != 0) {
  // evaluate user.friend.age + user.age
}
}
```

FIG. 4E

```
if ((dirtyFlags & 0b101101L) != 0) {
  // update name_and_age_view
}
if ((dirtyFlags & 0b100101L) != 0) {
  // update name_view
}
if ((dirtyFlags & 0b111011L) != 0) {
  // update total_age_view
}
```

FIG. 4F

`<TextView platform:id="@+id/view1" platform:text="@{a > 3 ? a : b}"/>`

FIG. 5A

| b | 0b00001 |
|---|---|
| a | 0b00010 |
| INVALIDATE ALL | 0b00100 |
| a > 3 is false | 0b01000 |
| a > 3 is true | 0b10000 |

FIG. 5B

```
if ((dirtyFlags & 0b111L) != 0) {
  // read >~a~~int3
  AInt3 = mA >3;
  // setting conditional flags
  if (AInt3) {
     dirtyFlags |= 0b10000L;
  } else {
     dirtyFlags |= 0b1000L;
  }
}
if ((dirtyFlags & 0b111L) != 0) {
  // read ?:>~a~~int3~a~~b~
  AInt3AB = AInt3 ? mA : mB;
}
if ((dirtyFlags & 0b111L) != 0) {
  // set view1 from AInt3AB
}
```

FIG. 5C

```
<TextView platform:id="@+id/view1" platform:text="@{a ? b : x}"/>
<TextView platform:id="@+id/view2" platform:text="@{b ? a : y}"/>
```

FIG. 6A

| d | 0b000000000001 |
| --- | --- |
| b | 0b000000000010 |
| c | 0b000000000100 |
| z | 0b000000001000 |
| y | 0b000000010000 |
| a | 0b000000100000 |
| x | 0b000001000000 |
| INVALIDATE ALL | 0b000010000000 |
| a ? b : x is false | 0b000100000000 |
| a ? b : x is true | 0b001000000000 |
| b ? a : y is false | 0b010000000000 |
| b ? a : y is true | 0b100000000000 |

FIG. 6B

```
if ((dirtyFlags & 0b10110010L) != 0) {
  // evaluate b
  // set b ? a : y conditional flags
} if ((dirtyFlags & 0b11100010L) != 0) {
  // evaluate a
  // set a ? b : x conditional flags
}
// batch finished
if ((dirtyFlags & 0b1000000000L) != 0) {
   // consider re-evaluating b if view1 is invalid and a is true
   // set b ? a : y flags
} if ((dirtyFlags & 0b10000000000L) != 0) {
  // evaluate y
} if ((dirtyFlags & 0b100000000000L) != 0) {
  // consider re-evaluating a if view2 is invalid and b is true
  // set a ? b : x flags
} if ((dirtyFlags & 0b100000000L) != 0) {
  // evaluate x
} if ((dirtyFlags & 0b11100010L) != 0) {
  // evaluate a ? b : x
} if ((dirtyFlags & 0b10110010L) != 0) {
  // evaluate b ? a : y
}
// batch finished
if ((dirtyFlags & 0b11100010L) != 0) {
  // update view 1
}
if ((dirtyFlags & 0b10110010L) != 0) {
  // update view 2
}
```

FIG. 6C

DATA BINDING DEPENDENCY ANALYSIS

This application claims the benefit of U.S. Provisional Application No. 62/166,765, filed May 27, 2015, the entire content of which is hereby incorporated by reference.

BACKGROUND

Some computer programs may provide a user interface, such as a graphical user interface. A graphical user interface may include one or more user interface elements, such as text fields, images, buttons, and menus, to name only a few examples. Various information and/or actions may be associated with the user interface elements. For example, a computer program may assign a value, such as a name, to a text field, such that a computing device executing the computer program displays the name in the text field. In another example, a computer program may associate an action with a button, such that when a user input selects the button, the computing device executing the computer program performs the action.

A computer program that provides a graphical user interface may be written to separate the data (e.g., model or model object) and the presentation logic (e.g., view) into different, but interoperable components. In some examples, controller logic (e.g., controller) may send commands to update the model and/or send commands to update the view. As such, the presentation logic may output the data from the model in the graphical user interface and/or receive user inputs at the graphical user interface that modify the data in a model. To facilitate the display and modification of such data, a computer program may include data bindings, which programmatically associate or otherwise link user interface elements to a model. By linking a user interface element to the model, a computer program may update a user interface element that corresponds to the model, if the model changes. However, data binding techniques may be computationally expensive and may require substantial computing resources.

SUMMARY

In one example, the disclosure is directed to a method that includes identifying, by a computing device and based at least in part on parsing source code of a layout file that defines a graphical user interface, a plurality of data binding expressions, wherein each of the plurality of data binding expressions defines a respective data binding between a user interface element of the graphical user interface and a model object; determining, by the computing device, based at least in part on the plurality of data binding expressions, one or more dependencies between each of the plurality of data binding expressions; generating, by the computing device, based at least in part on the one or more dependencies, additional source code for updating at least one respective data binding defined by the plurality of data binding expressions in response to a change to at least one property of the model object; and generating, by the computing device, an application comprising machine-executable code that is based at least in part on the source code of the layout file, the model object, and the additional source code.

In another example, the disclosure is directed to a computing device that includes at least one processor; a preprocessor module operable by the at least one processor to: identify, based at least in part on parsing source code of a layout file that defines a graphical user interface, a plurality of data binding expressions, wherein each of the plurality of data binding expressions defines a respective data binding between a user interface element of the graphical user interface and a model object; determine, based at least in part on the plurality of data binding expressions, one or more dependencies between each of the plurality of data binding expressions; generate, based at least in part on the one or more dependencies, additional source code for updating at least one respective data binding defined by the plurality of data binding expressions in response to a change to at least one property of the model object; and a compiler module operable by the at least one processor to generate, an application comprising machine-executable code that is based at least in part on the source code of the layout file, the model object, and the additional source code.

In another example, the disclosure is directed to a computer-readable storage medium including instructions that, when executed, cause one or more processors of a computing device to identify, based at least in part on parsing source code of a layout file that defines a graphical user interface, a plurality of data binding expressions, wherein each of the plurality of data binding expressions defines a respective data binding between a user interface element of the graphical user interface and a model object; determine, based at least in part on the plurality of data binding expressions, one or more dependencies between each of the plurality of data binding expressions; generate, based at least in part on the one or more dependencies, additional source code for updating at least one respective data binding defined by the plurality of data binding expressions in response to a change to at least one property of the model object; and generate, an application comprising machine-executable code that is based at least in part on the source code of the layout file, the model object, and the additional source code The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4F are a series of conceptual diagrams illustrating different phases of an example pre-compilation process performed by an example computing device that compiles source code with data bindings, in accordance with one or more aspects of the present disclosure.

FIGS. 5A-5C are a series of conceptual diagrams illustrating different phases of an additional example pre-compilation process performed by an example computing device that compiles source code with data bindings, in accordance with one or more aspects of the present disclosure.

FIGS. 6A-6C are a series of conceptual diagrams illustrating different phases of an additional example pre-compilation process performed by an example computing device that compiles source code with data bindings, in accordance with one or more aspects of the present disclosure.

DETAILED DESCRIPTION

In general, techniques of this disclosure may enable a computing device to generate source code that, once compiled and executed as an application, causes the application to only update the user interface elements of a graphical user interface that are data binded to property values of model objects that have changed since the previous updates to the graphical user interface. As used herein, the term "model objects" refer to elements that store data related to the model. The computing device may parse and analyze a layout file that defines the graphical user interface to determine one or more dependencies that may exist between different data binding expressions. For example, the computing device may determine which data binding expressions of the layout file have terms that depend on the same properties of a particular model object.

The computing device may use the dependencies to build a set of logical rules that define which data bindings to update when the various property values of that particular model object change. The computing device may pre-compile the rules as generated source code that is subsequently compiled, along with other application source code, when the computing device builds the underlying application. When the application is executed, rather than update the entire user interface each and every time a model object property value changes, the generated source code may cause the application to only update those user interface elements that are affected by the change.

Figure 1:
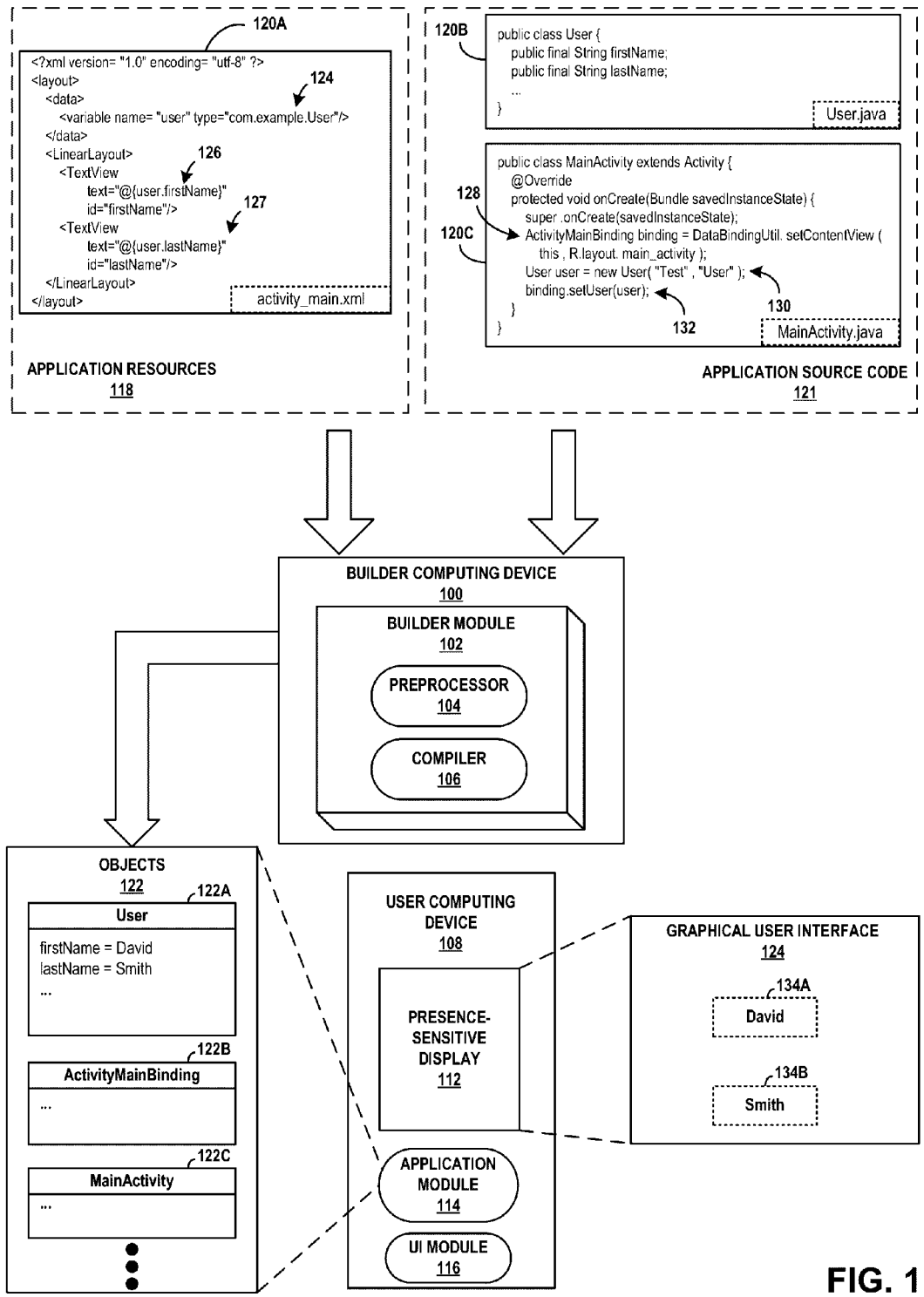
FIG. 1 is a conceptual diagram illustrating an example computing device that compiles source code with data bindings, in accordance with techniques of the disclosure.

FIG. 1 is a conceptual diagram illustrating builder computing device 100 as an example builder computing device that compiles source code with data bindings, in accordance with techniques of the disclosure. In the example of FIG. 1, builder computing device 100 may be a desktop computer. However, in other examples, builder computing device 100 may be a tablet computer, a smartphone, a laptop computer, workstation, server, or another type of computing device. Builder computing device 100 may be a computing device used by a software developer to write computer programs comprised of source code, and compile the source code in an executable computer program. In some examples, builder computing device 100 may be a server that is accessed by a workstation of a software developer via a network to compile source code into a computer program. Although not shown in FIG. 1, builder computing device 100 may include applications and/or modules in addition to builder module 102. For instance, computing device 100 may include an operating system, integrated development environment, text editor, web browser, command line terminal, or any other applications and/or modules that are executable by a computing device, to name only a few examples.

Builder computing device 100 may receive one or more application resources 118 and application source code 121, which computing device 100 may compile into one or more applications, such as application module 114. Application resources 118 may include but are not limited to build scripts, source code or markup language that defines an appearance graphical user interface, and data files (e.g., text files, images, etc. included in the application), to name only a few examples. Application source code 121 may define controller logic, the application model, and functionality of the presentation logic for application module 114.

Builder computing device 100 may include one or more sub-components to process and compile application resources 118 and application source code 121. For instance, as shown in FIG. 1, builder module 102 may include a preprocessor 104 and a compiler 106. As further described in this disclosure, preprocessor 104 may parse application resources, such as source code that defines an appearance graphical user interface, to identify syntax elements that represent data bindings. Based on the syntax elements, preprocessor 104 automatically generates source code for binding objects, which may improve the runtime performance of an application.

Builder module 102 may also include a compiler 106. Compiler 106 may compile human-readable source code (e.g., generated by preprocessor 104 and/or written by a user) into machine-executable code. For instance, compiler 106 may perform lexical analysis of the human-readable source code. Lexical analysis may include dividing syntax elements of the source code into tokens. Each token may correspond to a symbol in a programming language, such as a keyboard, variable, or number. Compiler 106 may also perform syntax analysis on the tokens. For instance compiler 106 may generate a tree data structure, called a syntax or parse tree, which organizes the tokens based on the relationships between syntax elements that correspond to the tokens. Each node of the syntax tree may represent a token. As such, the syntax tree may represent the structure or organization of the computer program. Compiler 106 may also perform type checking on the syntax tree to determine if one or more programming language requirements are violated.

In some examples, compiler 106 may convert the human-readable source code in a syntax tree into machine-independent intermediate code, while in other examples, compiler 106 may convert the human-readable source code into assembly language for a specific machine architecture. For purposes of this disclosure, machine-executable code may refer to machine-independent intermediate code or assembly language for a specific computer architecture. The machine-independent intermediate code may be executed by a runtime environment or virtual machine (VM) that has been compiled for a specific computer architecture, while assembly language for a specific machine architecture is executed directly by a processor having a particular computer architecture.

As shown in FIG. 1, an application module 114 may include the machine-executable code. User computing device 108 may store and execute application module 114. In the example of FIG. 1, user computing device 108 may be a mobile phone. However, in other examples, computing device 108 may be a tablet computer, a personal digital assistant (PDA), a laptop computer, a portable gaming device, a portable media player, an e-book reader, a smartwatch, television platform, or another type of computing device.

Application modules 114 of user computing device 108 may include functionality to perform any variety of operations on computing device 108. For instance, application module 114 may include an email application, text messing application, instant messaging application, weather application, video conferencing application, social networking application, stock market application, emergency alert application, sports related application, office productivity application, multimedia player, to name only a few examples.

Although shown as being operable by user computing device 108, application module 114 may interoperate with a remote computing device that is communicatively coupled to user computing device 108. In such examples, an application module executing at a remote computing device and may cause the remote computing device to send information to application module 114 using any suitable form of data communication (e.g., wired or wireless network, short-range wireless communication such as Near Field Communication or Bluetooth, etc.). In some examples, a remote computing device may be a computing device that is separate from user computing device 108. For instance, the remote computing device may be operatively coupled to user computing device 108 by a network. Examples of a remote computing device may include, but are not limited to a server, smartphone, tablet computing device, smart watch, and desktop computer. Application module 114 and user interface module 116 may be implemented in various ways. For example, any of modules 114 and 116 may be implemented as a downloadable or pre-installed application or "app." In another example, any of modules 114 and 116 may be implemented as part of an operating system of user computing device 108.

As shown in FIG. 1, user computer device 108 may include a presence-sensitive display 112. Presence-sensitive display 112 of user computing device 108 may function as an input device and as an output device for user computing device 108. In some examples, presence-sensitive display 112 may include an integrated presence-sensitive input device and a display device. For instance, presence-sensitive display 112 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Presence-sensitive display 112 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to the user of user computing device 108.

Presence-sensitive display 112 may receive indications of the user input by detecting one or more tap and/or non-tap gestures, continuous gestures, or other any touch gestures (e.g., multi-touch gestures) received by user computing device 108 (e.g., the user touching or pointing to one or more locations of presence-sensitive display 112 with a finger or a stylus pen). Based on indications of user input, a display device of presence-sensitive display 112 may present output to a user. For instance, a display device of presence-sensitive display 112 may present various user interfaces of applications executing at user computer device 108. A user of user computing device 108 may provide user input at a presence-sensitive input device of presence-sensitive display 112 to interact with one or more of these applications.

User computing device 108 may also include UI module 116. UI module 116 of user computing device 108 may receive from presence-sensitive display 112, one or more indications of user input detected at presence-sensitive display 112. Generally, each time presence-sensitive display 112 receives an indication of user input detected at a particular location of presence-sensitive display 112, UI module 116 may receive information about the user input from presence-sensitive display 112. UI module 116 may assemble the information received from presence-sensitive display 112 into a set of events, which may be time-ordered, that are indicative of a gesture, such as a sequence of one or more touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 112, a time component related to when presence-sensitive display 112 detected user input at the location, and/or an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

UI module 116 may determine one or more characteristics of the user input based on the sequence of touch events and include information about these one or more characteristics within each touch event in the sequence of touch events. For example, UI module 116 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). UI module 116 may transmit otherwise make available to application module 114 the sequence of touch events including the components or parameterized data associated with each touch event.

UI module 116 may act as an intermediary between various components of computing device 106 to make determinations based on input detected by presence-sensitive display 112 and generate output presented by presence-sensitive display 112. For instance, UI module 116 may receive, as an input from application 114, a representation of graphical user interface that includes text views 134A and 134B. UI module 116 may also receive, as an input from application module 114, a sequence of touch events generated from information about user input detected by presence-sensitive display 112. UI module 116 may determine, based on the location components in the sequence touch events that one or more location components approximate a selection of one or more locations of graphical user interface 124 (e.g., UI module 116 may determine the location of one or more of the touch events corresponds to an area of presence-sensitive display 112 that presents graphical user interface 124). UI module 116 may transmit, as output to application module 114, the sequence of touch events. UI module 116 may also receive, information application module 114, which may be output for display at presence-sensitive display 112. UI module 116 may update graphical user interface 124, for example, to include text views 134A and 134B. UI module 116 may cause presence-sensitive display 112 to display graphical user interface 124, which includes text views 134A and 134B.

As shown in FIG. 1 and described above, a software developer may write application resources 118 and application source code 121 such that, when compiled by builder computing device 100, application module 114 is comprised of machine-executable code. Application resources 118 include a layout file 120A that defines the layout and appearance of graphical user interface 124. In the example of FIG. 1, layout file 120A is written in Extensible Markup Language (XML), although any programming language may be used. For example purposes, source code included in FIG. 1 is illustrated with pseudocode, and actual code may include more or fewer syntax elements. Layout file 120A may have a file name Activity_main.xml.

To establish a data binding between a model object and a user interface element of graphical user interface 124, such as text view 134A, a software developer may include one or more syntax elements in source file 120A that cause builder module 102 to establish a data binding at compile time between a user interface element of graphical user interface 124 and a property of a model object. For example, layout file 120A includes a syntax element 126 represented by the value @{user.firstName}. In some examples, the value, @{user.firstName}, may be referred to as an expression. Expressions within a layout may be written in attribute properties using the "@{ }" syntax. In some examples, an expression is placeholder value that is evaluated at runtime and replaced with a value based on the syntax of the expression. For instance, the expression @{user.firstName} may be replaced by the first name of a user, when the expression is evaluated at runtime.

Syntax element 126 is associated with text view 134A, by incorporating the syntax element 126 within the declaration of text view 134A as shown in FIG. 1:
<TextView text=
"@{user.firstName}"
id="firstName"/>
Layout file 120A may also include a syntax element that indicates a type of a model object that is bound to a user interface element. For instance, layout file 120A may include syntax element 124 that specifies the type of the model object that is bound to text view 134A. Syntax element 124, in FIG. 1, is a tag that includes a variable name "user" having a scope local to layout file 120A and a fully qualified class name of the class "com.example.User" that includes the definition for the model object. As further described in this disclosure, preprocessor 104 may use syntax elements 124 and 126 to automatically generate, at compile time, a binding object that provides for data binding between text view 134A and a model object.

Syntax element 126 may identify a class for a model object that includes properties bound to text views 134A and 134B. A model object may include data or state information for at least a portion of application module 114. In the example of FIG. 1, a model object 122A that is defined by the User class of source file 120B may include the first and last name of a user. Application source file 120B includes a class that defines the User model object. For instance, the User class of source file 120B includes properties firstName and lastName that respectively correspond to a user's first name and a user's last name. String values assignable to each of the firstName and lastName properties. At runtime, User model object 122A may include state information for a user, such as a first name value and a last name value.

In some examples, a model object may be observable. As such, one or more observer objects may be registered with the model object to listen for notifications that indicate changes in the state of the model object. In some examples, a binding object, such as ActivityMainBinding binding object 122B, in this disclosure may be an observer. Accordingly, if the state of the model object changes, the binding object may be notified and perform additional actions based on the model object changes.

Application source code 121 may also include application source file 120C. Application source file 120C may define a class that is initially executed by user computing device 108 when application source file 120C is launched, opened, or otherwise initiated. Application source code 121 includes a statement 128 that obtains a reference or handle to a binding object, wherein the source code for the binding object will be automatically generated by compiler 106 based on syntax elements 124, 126 and 127, as further described in this disclosure. Statement 130, when executed, instantiates a new User model object and initializes the first name and last name properties of the model object 122A to "Test" and "User". Statement 132 establishes a data binding between model object 122A and text views 120A and 120B, using the data binding object 122B.

To compile application resources 118 and application source 121, builder module 100 may initially receive files 120A-120C. Preprocessor 104 may identify, based on parsing source code of layout file 120A, syntax elements 126 and 127 that represents data bindings. Using the fully-qualitied class name of the model object 122A in syntax element 124, preprocessor 104 may determine that a data binding comprises an association between the first name property of a User model object 122A and a user interface element, that is text view 134A, of graphical user interface 124. The text view 134A corresponds to syntax element 126 because it is included in the tag that defines text view 134A. Similarly, preprocessor 104 may determine that a data binding comprises an association between the last name property of a User model object 122A and a user interface element, that is text view 134B, of graphical user interface 124. The text view 134B corresponds to syntax element 127 because it is included in the tag that defines text view 134B.

To determine that the data binding comprises an association between the first name property of a User model object 122A and text view 134A, preprocessor 104 determines the value "user.firstName" between the curly braces of syntax element 126, and determines whether a property exists in the User class identified by the fully qualified class name of syntax element 124 that corresponds to "firstName". In the example of FIG. 1, the property "firstName" of the User class matches the value "user.firstName" in syntax element 126. In some examples, preprocessor 104 may automatically determine that a method getFirstName( ) which returns the value of the property firstName in the User class, matches the value "user.firstName" in syntax element 126, based on one or more programming conventions. For instance, the programming convention may include a public scope method with a name (getFirstName or setFirstName) that corresponds to a private scope property (firstName). Based on the name of the property (e.g., firstName), preprocessor may determine the corresponding method name (e.g., getFirstName). As such, preprocessor 104 may determine a match between a value in syntax element of a layout file and a property name in a model object source file, although the value and the property name do not match exactly.

In response to determining that the value "user.firstName" in syntax element 126 matches the property firstName in the source code for the User model object 122A, preprocessor 104 may automatically generate source code for a binding object 122B. In some examples, preprocessor 104 may generate a class that defines the binding object 122B, wherein the class name is a concatenation of the layout file name and the word "Binding", such as "ActivityMainBinding" shown in FIG. 1 with respect to the binding object 122B.

Preprocessor 104 may automatically generate the source code for the binding object 122B such that the property firstName of the User model object 122A and the user interface element, text view 134A of graphical user interface 124 are each accessible to the binding object 122B. To make the property firstName of the User model object 122A and text view 134A accessible to the binding object 122B, preprocessor 104 may include references to the User model object 122A and text view 134A in the source code for the binding object 122B. For instance, the binding object source code may include a reference or pointer to text view 134A, such that the binding object 122B may address or access text view 134A to perform one or more operations on text view 134A.

In some examples, preprocessor 104 may also generate a listener method that performs one or more operations in response to User model object 122A's state changing. That is, preprocessor 104 may register the binding object 122B with the User model object, such that when the state of User model object 122A changes at runtime, binding object 122B will be notified by the User model object. In some examples, the notification may indicate which specific properties of the User model object 122A have changed.

Preprocessor 104 may automatically generate source code for the listener method of binding object 122B, which causes the user interface elements in graphical user interface 124 to be updated with changed values from model object 122A. For example, source code in source file 120C (or another source file) may cause the firstName property of the User model object 122A to be updated at runtime. In response to setting the firstName property, the User model object 122A may notify any observer objects that are registered as observers of the User model object 122A. Because the binding object 122B includes automatically generated source code for a listener method, the listener method receives an identifier of the firstName property that has changed in the User model object 122A. The listener method may include source code automatically generated by preprocessor 104 that causes text view 134A to be updated with the changed value of firstName in the User model object 122A. For instance, the source code may include a reference in the binding object 122B to the User model object 122A to access the updated value of the firstName property. The source code may use a reference in the binding object 122B to the text view 134A (i.e., a user interface element) to set the value of text value 120A that is output for display to the updated value of the firstName property from the User model object 122A. As such, the source code for the binding object 122B comprises a set of instructions that update the user interface element in response to a change in the property of the model object.

Compiler 106 may generate application module 114, which includes machine-executable code, based at least in part on the source code of the layout file, the source code of the model object, and the automatically-generated source code of the binding object. That is, compiler 106 may compile the source code of the layout file, the source code of the model object, and the automatically-generated source code of the binding object, into application module 114. Further details of compiling the source code are described in FIG. 2. Application module 114 may be loaded on user computing device 108 and executed by user computing device 108. During execution (e.g., during runtime), computing device 108 may instantiate one or more objects 122. Objects 122 may include User model object 122A (based on source file 120B), binding object 122B (based on source code automatically generated by preprocessor 104), and a main program object 122C (based on source file 120C). Program execution may begin with instructions of main program object 122C. Initially, text view 134A and text view 134B may include the values "Test" and "User", respectively, in graphical user interface 124. The values "Test" and "User" may be stored in User model object 122A.

At a later time during execution of application module 114, the properties firstName and lastName of User model object 122A may be updated to "David" and "Smith." User model object 122A may, upon setting firstName and lastName to "David" and "Smith", respectively, notify any observer objects that are registered as observers of User model object 122A. Binding object 122B, which is registered as an observer object for User model object 122A, receives a notification via the listener method that the properties firstName and lastName of User model object 122A have changed. Accordingly, binding object 122B uses its reference to the User model object to determine the updated values for firstName and lastName of User model object 122A. Binding object 122B then uses its references to text view 134A and text view 134B, to update text view 134A and text view 134B to display "David" and "Smith", respectively. In this way, binding object 122B implements a data binding between, for example, model object 122A and text view 134A. As the state of the underlying User model object 122A changes, text views 120A and 120B may be updated using data binding object 122B.

In accordance with techniques of this disclosure, preprocessor 104 of builder module 102 may generate source code that improves run-time performance of binding operations executed by user computing device 108 as user computing device 108 executes application module 114. The generated source code, once compiled by compiler 106 and later executed by user computing device 108 as application module 108, may cause application module 108 to only update the user interface elements (e.g., text views 134A and 134B) of graphical user interface 124 that are data binded to property values of model object 122A that have changed since the last time that application module 108 caused UI module 1160 to update graphical user interface 124 as user interface 124 is displayed at presence-sensitive display 112.

For example, before compiler 106 compiles application resources 118 and application source code 121 as part of the build process for generating the machine-executable code of application module 108, builder computing device 100 may identify, based at least in part on parsing source code of a layout file that defines a graphical user interface, a plurality of data binding expressions. Each of the plurality of data binding expressions may define a respective data binding between a user interface element of the graphical user interface and a model object. For example, preprocessor 104 may parse layout file 120A for one or more expressions that include syntax element 126 as an indication that the expression is a data binding expression.

Builder computing device 100 may determine, based at least in part on the plurality of data binding expressions, one or more dependencies between each of the plurality of data binding expressions. For example, preprocessor 104 may identify the various model object properties that are used as terms in the identified data binding expressions and determine which specific data binding expressions that need to be evaluated when each of the various properties changes values. Preprocessor 104 may flag a data binding expression as being dependent on a particular model object property if that data binding expression includes that particular model object property as one of its terms.

Builder computing device 100 may generate, based at least in part on the one or more dependencies, additional source code for updating at least one respective data binding defined by the plurality of data binding expressions in response to a change to at least one property of the model object. For example, preprocessor 104 may output additional application source code that defines one or more rules or evaluation operations for determining which data binding expressions need evaluating when any of the model object properties changes. For example, preprocessor 104 may generate source code that defines a rule that causes application module 108 to only evaluate the data binding expression associated with text view 134A be if user.firstName changes and refrain from or not evaluate the data binding expression associated with text view 134B.

Builder computing device 100 may generating an application comprising machine-executable code that is based at least in part on the source code of the layout file, the model object, and the additional source code. For example, compiler 106 may compile the additional source code generated by preprocessor 104 along with application source code 121 and application resources 118 when compiler 106 produces the machine-executable code of application module 108.

In this way, when user computing device 102 executes application module 114, rather than update the entire user interface 124 each and every time any model object property value changes, the generated source code created by preprocessor 104 may cause application module 114 to only update those user interface elements that are effected by the change. Unlike other builder computing devices that build applications which evaluate each binding expression of a user interface each and every time that any model object property value of the user interface changes, an example builder computing device that compiles source code with data bindings, in accordance with techniques of the disclosure, may build applications that only evaluate binding expressions that are directly impacted by changes in model object property values. In this way, the example builder computing device may create applications that, when executed at a user computing device, perform fewer operations to maintain data bindings of a user interface, and therefore operate more efficiently and consume less electrical power than other applications that are built by other builder computing devices.

Figure 2:
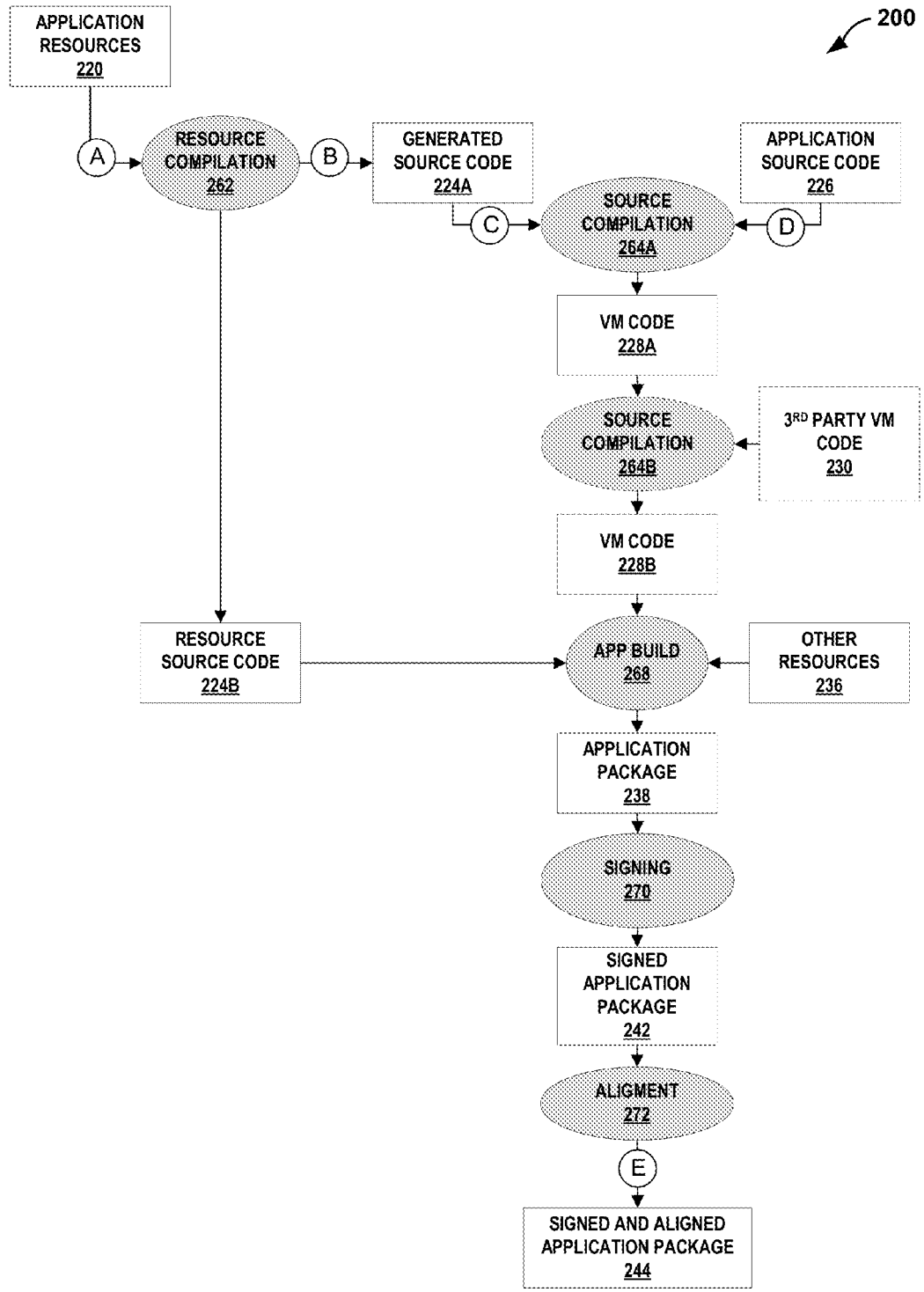
FIG. 2 is a flowchart illustrating an example software compilation and build process performed by an example computing device, in accordance with one or more aspects of the present disclosure.

FIG. 2 is a flowchart illustrating software compilation and build process 200 that may be performed by an example computing device, such as builder computing device 100 of FIG. 1, in accordance with one or more aspects of the present disclosure. Process 200 is described in the context of builder module 102 of builder computing device 100 of FIG. 1.

Process 200 involves the manipulation and generation of intermediate files 220-244 through performance of operations 262-272 for producing processor executable application program code. That is, intermediate files 220-244 represent the information (e.g., data) that builder module 102 of builder computing device 100 may generate at various stages of process 200 as builder module 102 performs each of operations 262-272 to generate code that is executable at a computing device, such as user computing device 108 of FIG. 1. Process 200 is just one example software compilation and build process that builder module 102 may perform. In some examples, builder module 102 may perform generate additional or fewer intermediate files and/or perform additional or fewer operations than the intermediate files and operations shown in process 200. In some examples, builder module 102 may perform the operations of process 200 in a different order than that shown in FIG. 2 and described below.

Process 200 starts with builder module 102 performing resource compilation 262 on one or more application resources 220 to produce generated source code 224A and 224B (collectively "generated source code 224"). By definition, application resources 220 represent information that specifies the predefined features (e.g., declared features and permissions) of an application, such as the features of an application user interface (e.g., design layout, objects, colors, and other predefined features). In contrast to application resources 220, application source code 226 by definition represents the logic behind the inner-workings of an application, including the logic behind the predefined features of an application and application user interface. For example, while application resources 220 may define the shape, color, or style of an object in a user interface of an application, application source code 226 may instead define the operations performed by a computing device when a user interacts with the object.

Since application resources 220 are typically defined in a mark-up language (e.g., extensible markup language [XML], etc.), and application resources 226 are often defined in a general-purpose or object-oriented programming language (e.g., Java, C, etc.), builder module 102 may need to perform various resource compilation 262 tasks on application resources 220 in order to translate and specify the predefined features of the application in a similar general-purpose or object-oriented programming language that is used to define the logical features of the application that are specified by application source code 226. For example, an asset packaging tool of builder module 102 may compile resources 220 and output generated source code 224 (e.g., r.java files) to specify the predefined features of the application in a language that is reconcilable, at compile time, with the logical features of the application defined by application source code 226.

Builder module 102 may perform source compilation 264A of generated source code 224A and application source code 226 to produce virtual machine (VM) code 228A. VM code 228A is by definition machine readable, executable code, that may be interpreted and executed by (e.g., a virtual machine module executing at) one or more processors of a computing device, such as user computing device 108. For example, in the Java programming language, .class files are examples of VM code 228A. Builder module 102 may perform source compilation 264A of generated source code 224A and application source code 226 by translating and reconciling the general-purpose or object-oriented programming language instructions associated with code 224A and 226 into VM code 228A that can later be interpreted and executed by a virtual machine.

In some examples, builder module 102 may optionally perform source compilation 264B of VM code 228A to produce virtual machine (VM) code 228B that is different than VM code 228A. For instance, some computing platforms may exist as a highly customized adaptation of a pre-existing computing platform. While a pre-existing computing platform may be suitable for some applications, some mobile computing and/or wearable computing platforms may offer various enhancements in execution and performance that require different VM code and/or a completely different virtual machine executing on underlying hardware to execute the different VM code. Builder module 102 may optionally perform source compilation 264B of VM code 228A to translate and redefine VM code 228A into machine readable, executable VM code 228B, that may be interpreted and executed by a different virtual machine module than the virtual machine module that can execute VM code 228A.

In some examples, builder module 102 may receive as input, any third party virtual machine code 230 that may need compiling when builder module 102 performs source compilation 264B of VM code 228A. For example, builder module 102 may compile VM code 228A into VM code 228B by further compiling any publicly available or other third party VM code 230 that a developer has instructed builder module 102 to include in the VM code 228B build stage.

At the application build 268 stage, builder module 102 may package VM code 228B with resource code 224B and other resources 236 to produce a single application package 238. Other resources 236 generally represent any "non-compiled" resources (e.g., images, etc.). Builder module 102 may upload application package 238 to an application repository from which, computing device 102 may download and install application package 238. One or more processor of computing device 102 may execute application package 238. For example, a VM executing at the one or more processors of computing device 102 may cause the one or more processors to perform the instructions defined by VM code 228A/228B.

In some examples, after builder module 102 builds application package 238, builder module 102 may perform additional operations before uploading or otherwise releasing application package 238 for subsequent execution by one or more computing devices, such as user computing device 108 of FIG. 1. For example, in some instances, builder module 102 may preform debug and/or release signing 270 of application package 238 to create signed application package 242. That is, before installation of the contents of application package 238, some computing devices may require the contents to have an identifier (e.g., a bit, a digital signature, a certificate, or some other marking) marking the author (e.g., the developer) of the contents as well as information specifying the contents as either being a debug or released version of the application. Builder module 102 may digitally sign the contents of application package 238 with an indication that the contents are either a debug or release version and output the marked contents as signed application package 242.

In some instances, builder module 102 may align 272 signed application package 242 to create signed and aligned application package 244 before uploading or otherwise releasing application package 244 for later execution by one or more computing devices, such as user computing device 108 of FIG. 1. For example, builder module 102 may perform alignment 272 of signed application package 242 to ensure that all uncompressed data associated with package 242 begins with a particular (memory) alignment relative to the beginning of the file. For instance, by performing alignment 272, builder module 102 may causes all uncompressed data within package 242, such as images or other uncompressed files, to be aligned on two-byte, four-byte, or other byte-level boundaries. In this way, all portions of package 244 can subsequently be accessed directly with a memory call, even if some portions contain binary data with alignment restrictions. By aligning signed application packages 242, builder module 102 may enable a computing device to execute application package 244 using less memory.

Figure 3:
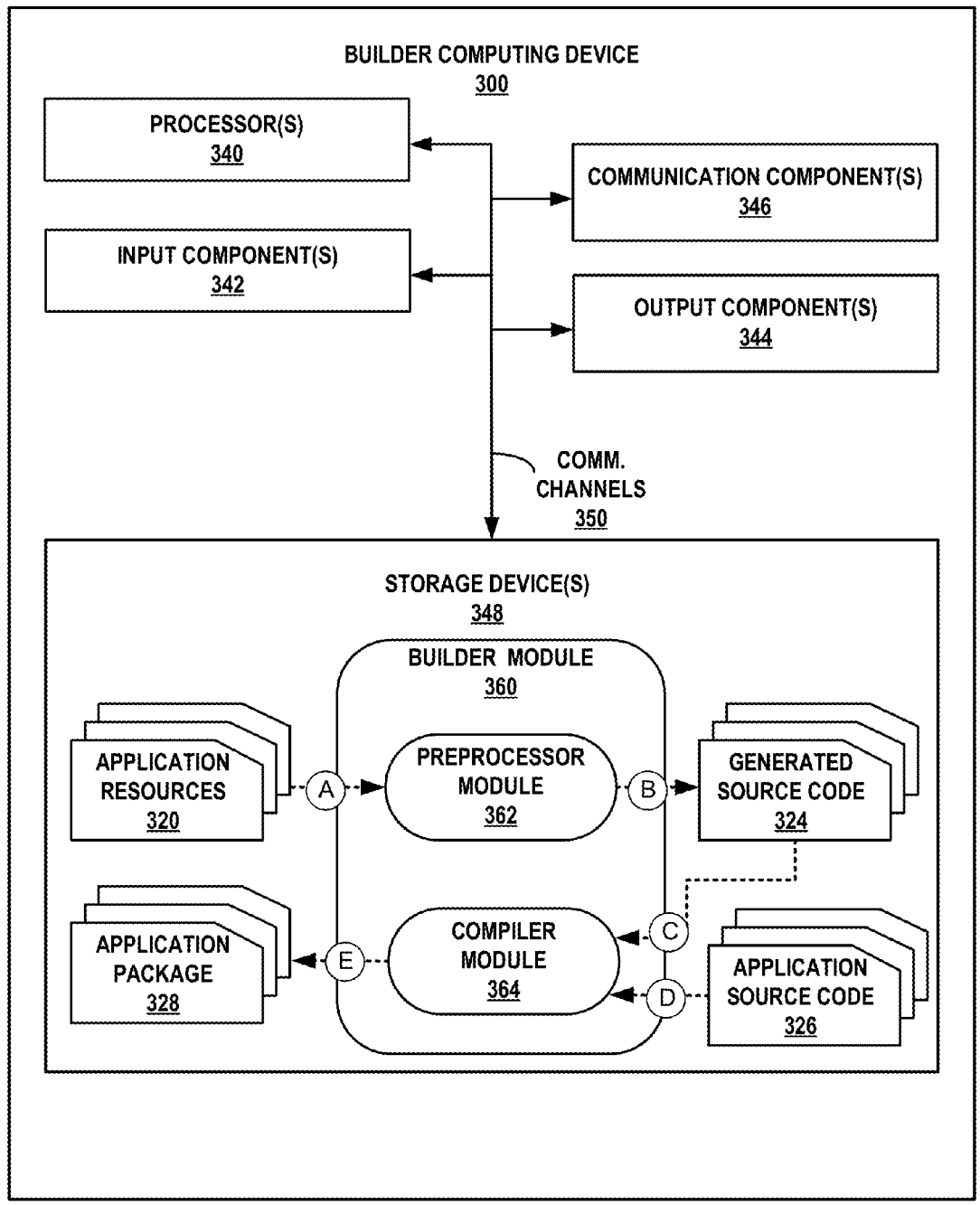
FIG. 3 is a block diagram illustrating an example computing device configured to perform an example software compilation and build process, in accordance with one or more aspects of the present disclosure.

FIG. 3 is a block diagram illustrating builder computing device 300 as an example computing device configured to perform an example software compilation and build process, in accordance with one or more aspects of the present disclosure. FIG. 3 illustrates only one particular example of builder computing device 300 and other examples of builder computing device 300 may exist. Builder computing device 300 of FIG. 3 may include a subset of the components included in builder computing device 100 of FIG. 1 and may include additional components not shown in FIG. 3. Builder computing device 300 may perform process 200 of FIG. 2.

Builder computing device 300 is described below in the context of builder computing device 100 of FIG. 1 and process 200 of FIG. 2.

In the example of FIG. 3, builder computing device 300 may be a mobile computing device (e.g., a mobile phone) or a non-portable computing device (e.g., desktop, laptop, workstation etc.). In any case, builder computing device 300 is a software development device configured to compile code as part of a build process (e.g., process 200 of FIG. 2) for creating one or more executable software applications, such as application packages 238-244 of FIG. 2.

As shown in the example of FIG. 3, builder computing device 300 includes one or more processors 340, one or more input components 342, one or more output components 344, one or more communication components 346, and one or more storage components 348. Storage components 348 of builder computing device 300 includes builder module 360, application resources 320, generated source code 324, application source code 326, and application package 328. Builder module 360 includes preprocessor module 362 and compiler module 364.

Communication channels 350 may interconnect each of the components 340, 342, 344, 346, and 348 for inter-component communications (physically, communicatively, and/or operatively). In some examples, communication channels 350 may include a wired and/or wireless system bus, a wired and/or wireless network connection, an inter-process communication data structure, or any other method for communicating data between internal components of builder computing device 300.

One or more input components 342 of builder computing device 300 may receive input on behalf of the various other components and modules of builder computing device 300. For example, keyboard input from a user of device 300 at a text editor for writing application source code 326 and/or application resources 320. Examples of input are tactile, audio, and video input. Input components 342 of builder computing device 300, in one example, includes a presence-sensitive display, a touch-sensitive screen, a mouse, a keyboard, a voice responsive system, a video camera, a microphone or any other type of device for detecting input from a human or machine.

One or more output components 344 of builder computing device 300 may generate output for receipt by other computing devices, systems, and a user of device 300. For example, one or more output components 344 may present a user interface of a text editor at a display of output components 344 from which a user of device 300 can view application source code 326 and/or application resources 320. Examples of output are tactile, audio, and video output. Output components 344 of builder computing device 300, in one example, includes a presence-sensitive display, sound card, video graphics adapter card, speaker, cathode ray tube (CRT) monitor, liquid crystal display (LCD), light emitting diode (LED) display, organic light emitting diode (OLED) display, or any other type of device for generating output to a human or machine.

One or more communication units 346 of builder computing device 300 may communicate with external devices via one or more wired and/or wireless networks by transmitting and/or receiving network signals on the one or more networks. Examples of communication unit 346 include a network interface card (e.g. such as an Ethernet card), an optical transceiver, a radio frequency transceiver, a GPS receiver, or any other type of device that can send and/or receive information. Other examples of communication units 346 may include short wave radios, cellular data radios, wireless network radios, as well as universal serial bus (USB) controllers.

One or more processors 340 may implement functionality and/or execute instructions within builder computing device 300. For example, processors 340 on builder computing device 300 may receive and execute instructions stored by storage components 348 that execute the functionality of modules 360, 362, and 364. These instructions executed by processors 340 may cause builder computing device 300 to store information within storage components 348 during program execution. Processors 340 may execute instructions of modules 360, 362, and 364 to cause modules 360, 362, and 364 to perform process 200 of FIG. 2. That is, modules 360, 362, and 364 may be operable by processors 340 to perform various actions or functions of builder computing device 300, for instance, producing generated source code 324 from application resources 320 for building application package 328 from generated source code 324 and application source code 326.

One or more storage components 348 within builder computing device 300 may store information for processing during operation of builder computing device 300 (e.g., builder computing device 300 may store data accessed by modules 360, 362, and 364 during execution at builder computing device 300). In some examples, storage component 348 is a temporary memory, meaning that a primary purpose of storage component 348 is not long-term storage. Storage components 348 on builder computing device 300 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 348, in some examples, also include one or more computer-readable storage media. Storage components 348 may be configured to store larger amounts of information than volatile memory. Storage components 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with modules 360, 362, and 364, application resources 320, generated source code 324, application source code 326, and application package 328.

Modules 360, 362, and 364 may perform operations using software, hardware, firmware, or a mixture of hardware, software, and/or firmware residing in and executing on builder computing device 300. Builder computing device 300 may execute modules 360, 362, and 364 with a single or multiple processors, such as processors 340. Builder computing device 300 may execute modules 360, 362, and 364 as a virtual machine (VM) executing on underlying hardware components of builder computing device 300. In some examples, modules 360, 362, and 364 may be arranged remotely to, and remotely accessible from, builder computing device 300, for instance, as one or more network services accessible by builder computing device 300 via a network cloud.

Builder module 360 is a more detailed example of builder module 102 of FIG. 1. Builder module 360 may perform the same, additional, or fewer operations than those performed by builder module 102. For example, builder module 360 may perform process 200 of FIG. 2, a subset of process 200, or additional operations beyond process 200 for interpreting, manipulating, and generating intermediate files 320-326 as part of a build-process for generating application package 328.

Builder module 360 includes compiler module 364. Compiler module 364 may perform source compilation operations to generated source code 324 and application source code 326 to produce machine readable, executable code that a computing device, such as user computing device 108, may execute (e.g., as a virtual machine). For example, compiler module 364 may translate and the reconciling the general-purpose or object-oriented programming language instructions associated with code 324 and 326 into a single set of VM code that compiler module 364 packages as application package 328. For example, compiler module 364 may include a Java or C compiler for translating generated source code 324 and application source code 326 into machine readable instructions that, when executed by a computing device, cause one or more processors to execute the operations associated with application package 328. In some examples, compiler module 364 may perform additional operations for building application package 328 (e.g., signing, alignment, and other operations such as operations 264A-272 of process 200 of FIG. 2). After compiler module 364 has finished compiling code 324 and 326 into a single application package 328, builder computing device 300 may output application package 328 for subsequent download, installation, and execution at a remote computing device, such as user computing device 108.

Builder module 360 further includes preprocessor module 362. Preprocessor module 362 is described in greater detail with respect to FIGS. 4A-4F, 5A-5C, and 6.

In general, preprocessor module 362 may perform pre-compilation stage, resource compilation operations (e.g., resource compilation 262 from process 200) against application resources 320 to produce generated source code 324 that compiler module 362 receives as input for building application package 328. The resource compilation operations performed by preprocessor module 362 may include operations for translating application resources 320 into generated source code 324 so the predefined features (e.g., layouts, view settings, etc.) of the application that are defined by application resources 320, are instead defined in a general-purpose or object-oriented programming language format that is readable by compiler module 364. For example, preprocessor module 362 may include an XML compiler that compiles the XML code of application resources 320 into logical Java or C code instructions that are interpretable by a Java or C compiler of compiler module 364.

In addition to converting the features defined by application resources 320 into general-purpose or object-oriented programming instructions, preprocessor module 362 may perform pre-compilation, dependency analysis operations against application resources 320 as a way to improve run-time performance of data binding operations that application package 328 may perform when application package 328 is installed and executed at a computing device, such as user computing device 108 of FIG. 1. In other words, preprocessor module 362 may analyze application resources 320 for data biding expressions and produce additional generated source code 324 that compiler module 362 may build into application package 328 to reduce the amount of time a computing device spends evaluating the data binding expressions during run-time.

As used herein, the terms "data binding expression" and "binding expression" generally refer to specific expressions or statements in application resource files, such as application resources 320, that have an identifier or syntax that identifies the expression as being a binding expression that defines a respective data binding between a user interface element of a graphical user interface and a model object. For example, the following pseudo code represents an example data binding expression that defines the value, as specified by the "user" model object, of a "TextView" (e.g., a character string) element a layout file of a graphical user interface:

<TextView text="@{user.fullName}"/>

When compiled and evaluated, the above expression may cause the portion of the graphical user interface that corresponds to the value of the TextView to include a character string that corresponds to the fullName property of the user model object.

As indicated in FIG. 1, applications built by other computing devices, while executing at computing devices, may consume additional computational resources to perform data binding operations. For example, simply calculating a layout (e.g., deciding the dimensions of each visible component on a user interface) when user interface components are updated may take tens of milliseconds (e.g., sixteen ms) of valuable processor time. Other computing devices may reevaluate and update all of the data binding expressions of an entire user interface when only the data and corresponding data binding expression(s) associated with a single user interface component has changed. As such, other computing devices may repeatedly spend tens of milliseconds recalculating layouts to ensure a user interface stays refreshed, even though only small portions of the layout may ever change.

Rather than requiring application package 328, while executing at a computing device, to repeatedly have to reevaluate all of the data binding expressions of an entire layout defined in application resources 320 each time a component of the layout changes, preprocessor module 362 generates specialized generated source code 324 that causes the computing device to only evaluate those data binding expressions that should be evaluated whenever the application package 328 determines that the particular data binding expressions have become invalid or otherwise need reevaluating. Said differently, preprocessor module 362 acts as an advanced static analysis tool which analyses application resources 320 (e.g., XML based layout files), for expressions contained in data binding statements and application source code 326 to resolve dependencies between data that may change, as well as the layout, or portions thereof, that use the changed data. From the analysis, preprocessor module 362 may produce generated source code 324 (e.g., object-oriented code) that enables application package 328 to update a user interface in a more efficient way by updating only the affected portions (e.g., views) of a layout that have changed.

For example, preprocessor module 362 may parse application resources 320 for data binding expressions and build expression trees from the data binding expressions. Preprocessor module 362 may analyze each of the expression trees to develop dependency trees (e.g., specifying rules for evaluating each expression, relative to the other data binding expression) for user in determining when and if to evaluate data binding expressions if other expression values change. In other words, for each data binding expression, preprocessor module 362 may produce general-purpose or object-oriented programming code that, when compiled and executed, instructs application package 328 on when and if to evaluate any given binding expression of a layout based on whether any other data binding expressions of the layout has been invalidated or not. For example, preprocessor module 362 may output generated source code 324 that includes operations for comparing a data change identifier flag to a bitmap that application package 328 can reference at run-time to determine when binding expressions of a layout file should be evaluated in response to changes in model object property value changes.

FIGS. 4A-4F are a series of conceptual diagrams illustrating different phases of an example pre-compilation process performed by an example computing device that compiles source code with data bindings, in accordance with one or more aspects of the present disclosure. FIGS. 4A-4F are described below in the context of builder computing device 300 of FIG. 3.

Preprocessor module 362 of builder computing device 300 may output generated source code 324 (e.g., data binding classes). Generated source code 324 may, when compiled by compiler module 364 with application source code 326, produce application packages 328 that (e.g., when installed and executed as application module 114 at a computing device such as user computing device 108 of FIG. 1) keep track of which user interface elements (e.g., views 134A and 134B) of a graphical user interface should be updated when model object properties change as well as the binding expressions that depend on the user interface elements that should be evaluated to process these updates.

For example, consider FIG. 4A which includes portions of source code that represent an example layout file from application resources 320. Preprocessor module 362 may receive as input, application resources 320, and parse the source code of the layout file of FIG. 4A. Based on the parsing, preprocessor module 362 may extract and maintain the variable definitions, import statements and expressions in a model for each layout file. In other words, preprocessor module 362 may identify, based at least in part on parsing source code of a layout file that defines a graphical user interface, a plurality of data binding expressions. Each of the plurality of data binding expressions may define a respective data binding between a user interface element of the graphical user interface and a model object.

Preprocessor module 362 may determine, based at least in part on the plurality of data binding expressions, one or more dependencies between each of the plurality of data binding expressions. That is, preprocessor module 362 may generate, based on the plurality of data binding expressions, a plurality of expression trees. Each expression tree from the plurality of expression trees may correspond to a particular data binding expression from the plurality of data binding expressions and may define one or more properties of the model object. The one or more properties of the model object may include the at least one property of the model object, that are terms of that particular data binding expression.

For example, FIG. 4B shows a table that includes three expression trees that preprocessor module 362 may generate based on the parsing of layout file of FIG. 4A. Preprocessor module 362 may produce data structures that maintain the relationships between the terms of the data binding expressions of the layout file of FIG. 4A and the model object according to the relationships defined in the expression trees of FIG. 4B. The left-side column of the table of FIG. 4B includes a particular binding expression identified by preprocessor module 362 and the right-side column of the table of FIG. 4B includes a corresponding expression tree type data structure associate with that particular binding expression. Preprocessor module 362 may generate the expression trees shown in FIG. 4B for analyzing the binding objects of the layout file of FIG. 4A.

In some examples, binding expressions may be defined as expressions that represent the root of each of the expression trees. For example, with regard to FIG. 4B, user.name, as well as user.name+" "+user.age, as well as user.friend.age+user.age are each considered binding expressions.

Preprocessor module 362 may determine, based at least in part on the plurality of data binding expressions, one or more dependencies between each of the plurality of data binding expressions. Each binding expression is a building block for data binding between an element of a graphical user interface and a property of a model object. In some examples, in determining the one or more dependencies, preprocessor module 362 may generate, based on the plurality of expression trees, a dependency tree that defines one or more data binding expressions from the plurality of data binding expressions that are to be evaluated before evaluating other data binding expressions from the plurality of data binding expressions. For example, based on the layout shown in FIG. 4A, preprocessor module 362 may determine a dependency tree represented by the following list:

1. user
2. user.name
3. " "
4. user.name+" "
5. user.age
6. user.name+" "+user.age
7. user.friend
8. user.friend.age
9. user.friend.age+user.age Each of the nine elements of the above list corresponds to a different expression or binding expression (e.g., expressions that have end results which are directly assigned into views). The above list of expressions and binding expressions can also be used by preprocessor module 362 to maintain the one or more dependencies between expressions. For example, if each line in the above list represents a different, numbered expression, preprocessor module 262 may represent the above list as the following dependency tree that indicates the expression dependencies that exist between expressions:

1. user
2. [1].name
3. " "
4. [2]+[3]
5. [1].age
6. [4]+[5]
7. [1].friend
8. [7].age
9. [8]+[1]

Each binding expression in the above list of expression dependencies, or so called dependency tree, depends on at most two other binding expressions. In other examples, a binding expression may depend on more than two other binding expressions. In fact, in some examples, a binding expression may depend on any number of expressions.

Preprocessor module 362 may generate, based at least in part on the one or more dependencies, additional source code for updating at least one respective data binding defined by the plurality of data binding expressions in response to a change to at least one property of the model object. For example, for each layout file from application resources 320, preprocessor module 362 may generate, as part of generated source code 324, a model representation of the computed binding expression dependencies.

At this step, preprocessor module 362 may have determined the dependency trees of the binding expressions of the layout file of FIG. 4A such that preprocessor module 362 can determine, for a particular binding expression, which other binding expressions should be calculated before evaluating the particular binding expression. For example, following the rules of the above dependency tree, preprocessor module 362 may, in evaluating binding expression [2] user.name, first evaluate user.

Some data binding techniques may enable application developers to mark model objects as "observable." When a model object is "observable", properties of that model object can be "invalidated" (e.g., when data associated with that property changes). When a property of a model object changes value and therefore becomes invalidated, the corresponding expressions that rely on that property also become invalid. Preprocessor module 362 may re-evaluate binding expressions when properties of model objects go invalid so as to ensure that a user interface includes accurate, refreshed information.

Based on the above dependency tree, preprocessor module 362 may develop rules associated with the identified binding expressions and use these rules to generating source code that causes application package 238, at run-time, to only update the identified binding expressions when terms or model object properties relied on by the identified binding expressions change. FIG. 4C shows a table of rules generated by preprocessor module 362. Each row in the table of FIG. 4C corresponds to a different binding expression and includes information about which model object property or properties that can cause that expression to become invalid and also an indication of when the expression should be evaluated, based on when other expressions are being evaluated. In other words, using the rules of FIG. 4C, preprocessor module 362 may generate, based at least in part on the one or more dependencies, additional source code for updating at least one respective data binding defined by the plurality of data binding expressions in response to a change to at least one property of the model object.

In some examples, to track which binding expressions need updating in response to changes in object model properties, preprocessor module 362 may cause application package 328 to, when executed, maintain a "status" flag that indicates when values of model object properties have changed. The additional source code produced by preprocessor module 362 may be generated for configuring application package 328 to, when executed, to update, in response to the change of a property of a model object, the status flag.

For example, the following is a list of example "invalidate flags" for different properties of an object model.

0b000001: user
0b000010: user.friend
0b000100: user.name
0b001000: user.age
0b010000: user.friend.age
0b100000: INVALIDATE ANY Each "observable" object model property that can be invalidated individually is assigned a single bit identifier in the list of invalidate flags. Each "non-observable" may not be assigned a bit identifier in the list of invalidate flags since by definition, non-observable properties do not change and therefore, may not cause binding expressions to need to be re-evaluated. In the above list of invalidate flags, the name property, friend property and age properties are all observable object model properties that have corresponding invalidate flags.

After determining the above list of invalidate flags and performing the above binding expression analysis, preprocessor module 362 generates source code that, when executed, causes an application to determine when binding expressions are invalid, when binding expressions should be evaluated, and which other binding expressions should be evaluated when a particular binding expression is evaluated. Preprocessor module 362 may determine that a particular binding expression is invalid if and only if itself or an invalidate flag of a dependent binding expression is invalid and further may determine that all dependencies of a particular data binding expression should be evaluated first, i.e., before evaluating the particular binding expression.

For example, FIG. 4D shows the information of the table of FIG. 4C expressed in terms of the above list of invalidate flags. In the table of FIG. 4C, notice that for some binding expressions that rely on more than one object model property, the "when it is invalid" flag is equal to the "when it should be evaluated" flag.

Preprocessor module 362 therefore generates source code that, when executed, causes an application to determine when binding expressions are invalid, when binding expressions should be evaluated, and which other binding expressions should be evaluated when a particular binding expression is evaluated. At run-time, when the source code generated by preprocessor module 362 is executed by an application, such as application module 114, the executed source code causes the application to keep a bitmap that holds the flags of FIG. 4D. Each time an invalidate flag indicates that a binding expression is invalidated, its corresponding flag bit is flipped (e.g., from zero to one). When the application updates the graphical user interface defined by a layout file, the application evaluates the binding objects of the binding expressions depending on these flag value. In this way, only binding expressions that need to be evaluated are evaluated. After evaluation, the corresponding invalidate flag is reset (e.g., flipped from one to zero).

The source code generated by preprocessor module 362 may cause an application to evaluate, at run-time, based on the flag, each of the one or more dependencies between each of the plurality of data biding expressions. The source code generated by preprocessor module 362 may further cause the application to evaluate, at run-time, each of the one or more dependencies between each of the plurality of data biding expressions by at least masking, with the flag, a respective bitmap associated with a particular binding expression from the plurality of binding expressions, the respective bitmap defining which of the one or more dependencies is associated with that particular binding expression. For example, FIG. 4E shows example source code that may be generated by preprocessor module 362 for configuring an application to evaluate, at run-time, binding expressions based on the above dependency analysis and invalidate bitmap. The example source code of FIG. 4E shows a bitwise and operation being performed between the invalidate flag (e.g., "dirtyFlags") and the respective "when it should be evaluated" flag from the table of FIG. 4D, for each binding expression.

The source code generated by preprocessor module 362 may further cause the application to update, at run-time, at least one data binding from the plurality of data binding expressions in response to evaluating each of the one or more dependencies between each of the plurality of data biding expressions based on the flag. For example, FIG. 4F shows additional example source code that may be generated by preprocessor module 362 for configuring an application to update, at run-time, all binding expressions that necessarily need updating. In the source code of FIG. 4F, may cause the application to re-evaluate, at run-time, a binding expression based on the "when it is invalid" flag of the binding expression from the table of FIG. 4E.

In some examples, while source code for updating a layout, preprocessor module 362 may execute the following simplified steps. Preprocessor module 362 may mark all binding expressions as not-handled. Preprocessor module 362 may next select binding expressions which are marked as not-handled and if none can be found, preprocessor module 362 may terminate this process. From the selected binding expressions, preprocessor module 362 may select binding expressions whose dependencies are already handled and preprocessor module 362 may generate the code that will evaluate the binding expression if necessary (e.g., using "when should evaluate" flags). Preprocessor module 362 may mark these binding expression as handled.

In some examples, due to dependencies between binding expressions, there may be a certain encapsulations between flags. For example, "should read flags" for user.age in the table of FIG. 4D may be guaranteed to be a subset of should read flags of user. This is given because there cannot be a case where an executing application needs to evaluate user.age but not user because user.age depends on user. The latter may not be true, since the executing application may need to evaluate user if user.name is invalidated but may not need to read user.age. Sometimes, this inheriancy represents exact equality. For instance, "should read flags" for user.friend may be exactly equal to "should read flags" for user.friend.age. This may be because these two object model properties are present only in the same binding expression (user.friend.age+user.age).

For instance, if there was another binding expression which includes user.friend.name, this would not be the case. Preprocessor module 362 takes advantage of this relationship to decrease number of branches performed by the executing application at runtime. The enhanced algorithm may cause preprocessor module 362 to operate as follows: mark all binding expressions as not-handled, select binding expressions which are marked as not-handled and if none can be found, terminate. However, from the binding expressions selected, choose a binding expression with dependencies that are all marked as handled (also referred to as "Expr A"). Preprocessor module 362 may generate the source code to read the binding expression and mark it as handled. This code may be generated inside an "if" statement which compares dirty flags with the "should read flags" of the Expr A.

From the list of binding expressions that depend on Expr A, preprocessor module 362 may select an expression which is marked as not-handled but all of their dependencies are handled (also referred to as "Expr B"). Preprocessor module 362 may generate source code to read Expr B. If "should read flags" of Expr B are NOT Expr A, preprocessor module 362 may generate source code that creates an if statement to check those flags. Otherwise, preprocessor module 362 may generate source code that ignores the "if" statement since it will always be true and mark Expr B as handled. Finally, preprocessor module 362 may generate source code that traverse dependencies of Expr B and recursively continue this step until no such binding expression can be found.

The above algorithm may work well assuming that the application that executes the code generated by preprocessor module 362 has permission to evaluate any binding expression. In some examples however (e.g., when the expression language supports conditional evaluation), the application that executes the code generated by preprocessor module 362 may not have permission to evaluate any binding expression. For example, the following pseudo code represents an example "conditional binding expression".

<TextView platform:id="@+id/friend_or_self_name" platform:text="@{userfriend==null?user.name:user.friend.name}"/>

When the application that executes the code generated by preprocessor module 362, the application should evaluate user.name if and only if user.friend equals null condition is true. Additionally, the application should evaluate user.friend.name if and only if user.friend equals null condition is false. As such, for the above example conditional binding expression, preprocessor module 362 may generate source code that causes the application to evaluate user.name as long as the application has user (e.g. all dependencies of user.name are satisfied).

Preprocessor module 362 may generate source code that causes the application to refrain from inheriting shouldRead-Flags" from a binding expression when the binding expression is behind a conditional. For the example above, preprocessor module 362 may generate source code that causes the application to refrain from getting shouldInvalidate flags for user.name if the binding expression for friend_or_self_name view is invalidated.

For these cases, preprocessor module 362 may create a conditional dependency that causes an executing application to consider these as lower level dependencies which do not guarantee execution. For the example above, the binding expression depends on user.name with the condition user.friend equals null. This dependency may be called a conditional dependency.

Preprocessor module 362 may generate source code that causes the application to create two flags for each conditional expression. For the language above, the binding expression may receive two flags, one represents the predicate being true and the other one represents the predicate being false (also referred to herein respectively as "flagT" and "flagF"). To clarify, flagT and flagF represent new flags in addition to the previous flags created for determining when binding expressions can be invalidated.

These flagT and flagF are added to the shouldReadFlags of each dependency of a binding expression. For the example above, flagT may be added to the shouldReadFlags of user.name and flagF may be added to the shouldReadFlags of user.friend.name.

Preprocessor module 362 may not select expressions which have conditional dependencies in their dependency tree (e.g. the binding expression may not have a conditional dependency but one of its dependencies may have a conditional dependency). When an expression, which is a predicate for another conditional dependency is evaluated, preprocessor module 362 may update the dirtyFlags variable depending on the result. If the predicate resolve to true, preprocessor module 362 may set flagT bit of dirtyFlags to one. If the predicate resolves to false, preprocessor module 362 may set FlagF bit of dirtyFlags to one.

After setting these flags, preprocessor module 362 may traverse all conditional dependencies, find the ones that depend on this predicate and elevate them. Elevating a dependency means moving it to a normal dependency (e.g., in other words, unlocking the evaluation of the dependant expression). When an expression is evaluated, preprocessor module 362 may not directly mark a binding expression as being handled anymore. Instead, preprocessor module 362 may check if preprocessor module 362 has covered all of its conditional cases as well. If preprocessor module 362 covered them, then preprocessor module 362 may mark them as read. If preprocessor module 362 has not covered its conditional cases yet, preprocessor module 362 may keep the conditional cases in the list.

FIGS. 5A-5C are a series of conceptual diagrams illustrating different phases of an additional example pre-compilation, binding expression analysis process performed by an example computing device, in accordance with one or more aspects of the present disclosure. FIGS. 5A-5C are described below in the context of builder computing device 300 of FIG. 3.

FIG. 5A shows an example binding expression from a layout file that includes a circular dependency between binding expression dependencies. Both 'a' and 'b' represent binding expression dependencies. As described above with respect to FIGS. 4A-4F, the expression selection step performed by preprocessor module 362 may ignore any binding expression that has conditional dependencies. For this example, evaluation of "a>"3 and a may conditionally depend on 'a' because of 'view1'.

The conditional dependency between "a>3" and a may create a deadlock where, preprocessor module 362 neither can find anything to evaluate nor can preprocessor module 362 finish generating the list of expressions. To clarify, preprocessor module 362 would wait for a to be resolved before evaluating a or "a>3" (because of view1). Rather than wait, in some examples, preprocessor module 362 may perform a dependency elimination while calculating "should read flags."

When calculating should read flags, if the expressions has a conditional dependency, preprocessor module 362 may check all possible invalidation sets that will trigger the predicate's evaluation. Then preprocessor module 362 may check whether the conditional expression would be calculated to calculate those dependencies. For the example above, when calculating should read flags for a, preprocessor module 362 may determine that to calculate the predicate in view1 (e.g., "a>3"), the application, at run-time, may have to calculate a because "a>3" depends on a. Because of this reason, preprocessor module 362 may drop the conditional. FIG. 5B shows an example list of invalidation flags for use by preprocessor module 362 in generating source code for evaluating circular dependencies in binding expressions, based on the above analysis described with respect to FIG. 5A. FIG. 5C shows example source code that may be generated by preprocessor module 362 to cause an application, at run-time, to handle the above analysis described with respect to FIG. 5A.

FIGS. 6A-6C are a series of conceptual diagrams illustrating different phases of an additional example pre-compilation, binding expression analysis process performed by an example computing device, in accordance with one or more aspects of the present disclosure. FIGS. 6A-6C are described below in the context of builder computing device 300 of FIG. 3.

FIG. 6A shows another example binding expression from a layout file that includes a binding expressions that have circular dependencies. In this case, 'b' has conditional dependency on 'a' because of 'view1' and 'a' has conditional dependency on 'b' because of 'view2'. As described above with respect to FIGS. 4A-4F, the evaluation path resolution mentioned performed by preprocessor module 362 may avoid creating a deadlock and start reading 'a' and 'b' but may never terminate because preprocessor module 362 may be unable to mark 'a' or 'b' as being fully read because to fully ready 'a', preprocessor module 362 needs to fully ready 'b' (and vice versa).

In some examples, preprocessor module 362 may handle such inter expression dependencies with a technique referred to as "partial reads". When an expression cannot be marked as handled, preprocessor module 362 may still mark the expression as being partially handled and consequent evaluations may only include the remaining bits.

Partial reads occur when preprocessor module 362 cannot mark an expression as fully read. Preprocessor module 362 may still keep track of the list of bits where preprocessor module 362 read that expression. Next time the expressions shows up in the unhandled list, preprocessor module 362 may only consider unread bits of the expressions while generating the code to avoid re-evaluating the expression in entirety. This way, for the code sample on FIG. 6A, preprocessor module 362 may first read 'a' and 'b' for the invalidation of 'view1' and 'view2' respectively, then preprocessor module 362 may read read 'a' and 'b' for their conditionals from 'view2' and 'view1' respectively.

FIG. 6B shows an example list of invalidation flags for use by preprocessor module 362 in generating source code for evaluating circular dependencies in binding expressions, based on the above analysis described with respect to FIG. 6A. FIG. 6C shows example source code that may be generated by preprocessor module 362 to cause an application, at run-time, to handle the above analysis described with respect to FIG. 6A.

Figure 7:
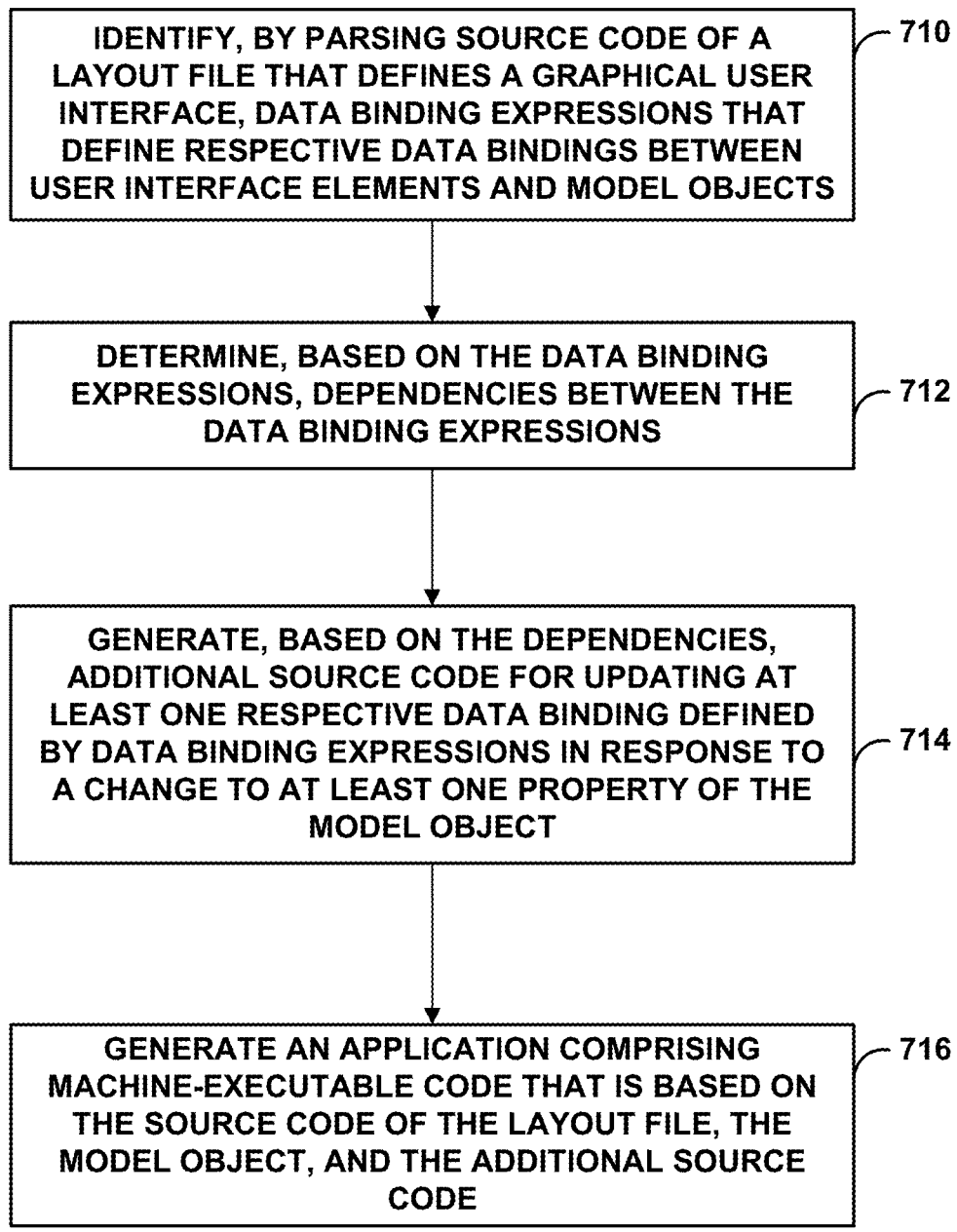
FIG. 7 is a flowchart illustrating example operations performed by an example computing device that compiles source code with data bindings, in accordance with one or more aspects of the present disclosure.

FIG. 7 is a flowchart illustrating operations 710-716 as example operations performed by an example computing device that compiles source code with data bindings, in accordance with one or more aspects of the present disclosure. FIG. 7 is described below in the context of binding computing device 300 of FIG. 3.

In operation, binding computing device 300 may identify, based at least in part on parsing source code of a layout file that defines a graphical user interface, a plurality of data binding expressions that each define a respective data binding between a user interface element of the graphical user interface and a model object (710). For example, when builder module 360 begins a build process for generating application package 328, preprocessor module 362 may parse application resources 320 to identify any and all binding expressions that define data bindings between elements of a user interface and model objects.

Rather than produce an application that, when executed at a user computing device, such as user computing device 108 of FIG. 1, expends valuable computing resources evaluating each and every binding expression of the user interface each time that a property of the model objects changes, builder module 360 may generate source code 324 that defines rules for improving the efficiency of the application and causes the application to only evaluate necessary binding expressions that depend on the property values that recently changed. Binding computing device 300 may determine, based at least in part on the plurality of data binding expressions, one or more dependencies between each of the plurality of data binding expressions (712). For example, preprocessor module 362 may analyze the terms of the identified binding expressions to find matching terms and other related dependencies between the binding expressions. In other words, preprocessor module 362 may identify similarities in the various model object properties that need evaluating when evaluating each of the binding expressions.

Binding computing device 300 may generate, based at least in part on the one or more dependencies, additional source code for updating at least one respective data binding defined by the plurality of data binding expressions in response to a change to at least one property of the model object (714). For example, preprocessor module 362 may generate source code 324 that causes application package 328 to, during execution, create a status flag for tracking changes to the properties of a model object as well as respective bitmaps associated with each of the binding expressions that define which of the one or more dependencies is associated with that particular binding expression. Preprocessor module 362 may further generate source code 324 that causes application package 328, during execution, to perform masking operations (e.g., bitwise and operations) between the status flag and each of the respective bitmaps to determine which binding expression needs to be evaluated in response to a change in a model object property.

Binding computing device 300 may generate, an application comprising machine-executable code that is based at least in part on the source code of the layout file, the model object, and the additional source code (716). For example, compiler module 364 may receive as inputs, application resources 320, generated source code 324, and application source code 326, and produce as output (e.g., by following process 200 of FIG. 2) application package 328. In some examples, builder computing device 300 may output application package 328 to a remote device, such as user computing device 108, for subsequent execution.

Clause 1. A method comprising: identifying, by a computing device and based at least in part on parsing source code of a layout file that defines a graphical user interface, a plurality of data binding expressions, wherein each of the plurality of data binding expressions defines a respective data binding between a user interface element of the graphical user interface and a model object; determining, by the computing device, based at least in part on the plurality of data binding expressions, one or more dependencies between each of the plurality of data binding expressions; generating, by the computing device, based at least in part on the one or more dependencies, additional source code for updating at least one respective data binding defined by the plurality of data binding expressions in response to a change to at least one property of the model object; and generating, by the computing device, an application comprising machine-executable code that is based at least in part on the source code of the layout file, the model object, and the additional source code.

Clause 2. The method of clause 1, further comprising: generating, by the computing device, based on the plurality of data binding expressions, a plurality of expression trees, wherein each expression tree from the plurality of expression trees corresponds to a particular data binding expression from the plurality of data binding expressions and defines one or more properties of the model object, the one or more properties including the at least one property of the model object, that are terms of that particular data binding expression, wherein the one or more dependencies between each of the plurality of data binding expressions are further determined based at least in part on the plurality of expression trees.

Clause 3. The method of clause 2, further comprising: generating, by the computing device, based on the plurality of expression trees, a dependency tree that defines one or more data binding expressions from the plurality of data binding expressions that are to be evaluated before evaluating other data binding expressions from the plurality of data binding expressions, wherein the one or more dependencies between each of the plurality of data binding expressions is further determined based at least in part on the dependency tree.

Clause 4. The method of any of clauses 1-2, wherein the additional source code is further generated for updating, in response to the change to the at least one property of the model object, a flag that defines changes to the at least one property of the model object.

Clause 5. The method of clause 4, wherein the additional source code is further generated for evaluating, based on the flag, each of the one or more dependencies between each of the plurality of data biding expressions.

Clause 6. The method of clause 5, wherein the additional source code is further generated for updating the at least one data binding from the plurality of data binding expressions in response to evaluating each of the one or more dependencies between each of the plurality of data biding expressions based on the flag.

Clause 7. The method of any of clauses 5-6, wherein the additional source code is further generated for evaluating each of the one or more dependencies between each of the plurality of data biding expressions by at least: masking, with the flag, a respective bitmap associated with a particular binding expression from the plurality of binding expressions to determine whether to evaluate the particular binding expression, the respective bitmap defining which of the one or more dependencies is associated with that particular binding expression.

Clause 8. The method of any of clauses 1-7, wherein the source code of the layout file comprises a mark-up language and the additional source code comprises an object-oriented programming language.

Clause 9. The method of any of clauses 1-8, further comprising: outputting, by the computing device, to a remote device, the application for execution at the remote device.

Clause 10. A computing device comprising: at least one processor; a preprocessor module operable by the at least one processor to: identify, based at least in part on parsing source code of a layout file that defines a graphical user interface, a plurality of data binding expressions, wherein each of the plurality of data binding expressions defines a respective data binding between a user interface element of the graphical user interface and a model object; determine, based at least in part on the plurality of data binding expressions, one or more dependencies between each of the plurality of data binding expressions; generate, based at least in part on the one or more dependencies, additional source code for updating at least one respective data binding defined by the plurality of data binding expressions in response to a change to at least one property of the model object; and a compiler module operable by the at least one processor to generate, an application comprising machine-executable code that is based at least in part on the source code of the layout file, the model object, and the additional source code.

Clause 11. The computing device of clause 10, wherein the preprocessor module is further operable by the at least one processor to: generate, based on the plurality of data binding expressions, a plurality of expression trees, wherein each expression tree from the plurality of expression trees corresponds to a particular data binding expression from the plurality of data binding expressions and defines one or more properties of the model object, the one or more properties including the at least one property of the model object, that are terms of that particular data binding expression; and determine, based at least in part on the plurality of expression trees, the one or more dependencies between each of the plurality of data binding expressions.

Clause 12. The computing device of clause 11, wherein the preprocessor module is further operable by the at least one processor to: generate, based on the plurality of expression trees, a dependency tree that defines one or more data binding expressions from the plurality of data binding expressions that are to be evaluated before evaluating other data binding expressions from the plurality of data binding expressions; and determine, based at least in part on the dependency tree, the one or more dependencies between each of the plurality of data binding expressions.

Clause 13. The computing device of any of clauses 10-12, wherein the preprocessor module is further operable by the at least one processor to generate the additional source code for updating, in response to the change to the at least one property of the model object, a flag that defines changes to the at least one property of the model object.

Clause 14. The computing device of clause 13, wherein the preprocessor module is further operable by the at least one processor to generate the additional source code for: evaluating, based on the flag, each of the one or more dependencies between each of the plurality of data biding expressions; and updating the at least one data binding from the plurality of data binding expressions in response to evaluating each of the one or more dependencies between each of the plurality of data biding expressions based on the flag.

Clause 15. The computing device of any of clauses 10-14, wherein the compiler module is further operable by the at least one processor to output, to a remote device, the application for execution at the remote device.

Clause 16. A computer-readable storage medium comprising instructions that, when executed, cause one or more processors of a computing device to: identify, based at least in part on parsing source code of a layout file that defines a graphical user interface, a plurality of data binding expressions, wherein each of the plurality of data binding expressions defines a respective data binding between a user interface element of the graphical user interface and a model object; determine, based at least in part on the plurality of data binding expressions, one or more dependencies between each of the plurality of data binding expressions; generate, based at least in part on the one or more dependencies, additional source code for updating at least one respective data binding defined by the plurality of data binding expressions in response to a change to at least one property of the model object; and generate, an application comprising machine-executable code that is based at least in part on the source code of the layout file, the model object, and the additional source code.

Clause 17. The computer-readable storage medium of clause 16, comprising additional instructions that, when executed, cause the one or more processors of the computing device to determine the one or more dependencies between each of the plurality of data binding expressions by at least: generating, based on the plurality of data binding expressions, a plurality of expression trees, wherein each expression tree from the plurality of expression trees corresponds to a particular data binding expression from the plurality of data binding expressions and defines one or more properties of the model object, one or more properties including the at least one property of the model object, that are terms of that particular data binding expression; and determining, based at least in part on the plurality of expression trees, the one or more dependencies.

Clause 18. The computer-readable storage medium of clause 17, comprising additional instructions that, when executed, cause the one or more processors of the computing device to determine the one or more dependencies between each of the plurality of data binding expressions by at least: generating, based on the plurality of expression trees, a dependency tree that defines one or more data binding expressions from the plurality of data binding expressions that are to be evaluated before evaluating other data binding expressions from the plurality of data binding expressions; and determining, based at least in part on the dependency tree, the one or more dependencies.

Clause 19. The computer-readable storage medium of any of clauses 16-18, comprising additional instructions that, when executed, cause the one or more processors of the computing device to further generate the additional source code for updating, in response to the change to the at least one property of the model object, a flag that defines changes to the at least one property of the model object.

Clause 20. The computer-readable storage medium of any of clauses 16-19, comprising additional instructions that, when executed, cause the one or more processors of the computing device to further generate the additional source code for evaluating, based on the flag, each of the one or more dependencies between each of the plurality of data biding expressions by at least masking, with the flag, a respective bitmap associated with a particular binding expression from the plurality of binding expressions to determine whether to evaluate the particular binding expression, the respective bitmap defining which of the one or more dependencies is associated with that particular binding expression.

Clause 21. The computing device of clause 10, wherein the preprocessor module and the compiler modules are further operable by the at least one processor to perform any of the methods of clauses 1-9.

Clause 22. A computing device comprising means for preforming any of the methods of clauses 1-9.

Clause 23. A computer-readable storage medium comprising instructions that, when executed by one or more processors of a computing device, cause the one or more processors to perform any of the methods of clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   identifying, by a computing device and based at least in part on parsing source code of a layout file that defines a graphical user interface, a plurality of data binding expressions, wherein each of the plurality of data binding expressions defines a respective data binding between a user interface element of the graphical user interface and a model object;
   determining, by the computing device, based at least in part on the plurality of data binding expressions, one or more dependencies between each of the plurality of data binding expressions;
   generating, by the computing device, based at least in part on the one or more dependencies, additional source code for updating at least one respective data binding defined by the plurality of data binding expressions in response to a change to at least one property of the model object; and generating, by the computing device, an application comprising machine-executable code that is based at least in part on the source code of the layout file, the model object, and the additional source code.

2. The method of claim 1, further comprising:
generating, by the computing device, based on the plurality of data binding expressions, a plurality of expression trees,
wherein each expression tree from the plurality of expression trees corresponds to a particular data binding expression from the plurality of data binding expressions and defines one or more properties of the model object,
the one or more properties including the at least one property of the model object, that are terms of that particular data binding expression,
wherein the one or more dependencies between each of the plurality of data binding expressions are further determined based at least in part on the plurality of expression trees.

3. The method of claim 2, further comprising:
generating, by the computing device, based on the plurality of expression trees, a dependency tree that defines one or more data binding expressions from the plurality of data binding expressions that are to be evaluated before evaluating other data binding expressions from the plurality of data binding expressions, wherein the one or more dependencies between each of the plurality of data binding expressions is further determined based at least in part on the dependency tree.

4. The method of claim 1, wherein the additional source code is further generated for updating, in response to the change to the at least one property of the model object, a flag that defines changes to the at least one property of the model object.

5. The method of claim 4, wherein the additional source code is further generated for evaluating, based on the flag, each of the one or more dependencies between each of the plurality of data biding expressions.

6. The method of claim 5, wherein the additional source code is further generated for updating the at least one data binding from the plurality of data binding expressions in response to evaluating each of the one or more dependencies between each of the plurality of data biding expressions based on the flag.

7. The method of claim 5, wherein the additional source code is further generated for evaluating each of the one or more dependencies between each of the plurality of data biding expressions by at least: masking, with the flag, a respective bitmap associated with a particular binding expression from the plurality of binding expressions to determine whether to evaluate the particular binding expression, the respective bitmap defining which of the one or more dependencies is associated with that particular binding expression.

8. The method of claim 1, wherein the source code of the layout file comprises a mark-up language and the additional source code comprises an object-oriented programming language.

9. The method of claim 1, further comprising:
outputting, by the computing device, to a remote device, the application for execution at the remote device.

10. A computing device comprising:
at least one processor;
a preprocessor module operable by the at least one processor to:
identify, based at least in part on parsing source code of a layout file that defines a graphical user interface, a plurality of data binding expressions, wherein each of the plurality of data binding expressions defines a respective data binding between a user interface element of the graphical user interface and a model object;
determine, based at least in part on the plurality of data binding expressions, one or more dependencies between each of the plurality of data binding expressions;
generate, based at least in part on the one or more dependencies, additional source code for updating at least one respective data binding defined by the plurality of data binding expressions in response to a change to at least one property of the model object; and
a compiler module operable by the at least one processor to generate, an application comprising machine-executable code that is based at least in part on the source code of the layout file, the model object, and the additional source code.

11. The computing device of claim 10, wherein the preprocessor module is further operable by the at least one processor to:
generate, based on the plurality of data binding expressions, a plurality of expression trees, wherein each expression tree from the plurality of expression trees corresponds to a particular data binding expression from the plurality of data binding expressions and defines one or more properties of the model object,
the one or more properties including the at least one property of the model object, that are terms of that particular data binding expression; and
determine, based at least in part on the plurality of expression trees, the one or more dependencies between each of the plurality of data binding expressions.

12. The computing device of claim 11, wherein the preprocessor module is further operable by the at least one processor to:
generate, based on the plurality of expression trees, a dependency tree that defines one or more data binding expressions from the plurality of data binding expressions that are to be evaluated before evaluating other data binding expressions from the plurality of data binding expressions; and
determine, based at least in part on the dependency tree, the one or more dependencies between each of the plurality of data binding expressions.

13. The computing device of claim 10, wherein the preprocessor module is further operable by the at least one processor to generate the additional source code for updating, in response to the change to the at least one property of the model object, a flag that defines changes to the at least one property of the model object.

14. The computing device of claim 13, wherein the preprocessor module is further operable by the at least one processor to generate the additional source code for:
evaluating, based on the flag, each of the one or more dependencies between each of the plurality of data biding expressions; and
updating the at least one data binding from the plurality of data binding expressions in response to evaluating each of the one or more dependencies between each of the plurality of data biding expressions based on the flag.

15. The computing device of claim 10, wherein the compiler module is further operable by the at least one processor to output, to a remote device, the application for execution at the remote device.

16. A non-transitory computer-readable storage medium comprising instructions that, when executed, cause one or more processors of a computing device to:

identify, based at least in part on parsing source code of a layout the that defines a graphical user interface, a plurality of data binding expressions, wherein each of the plurality of data binding expressions defines a respective data binding between a user interface element of the graphical user interface and a model object;

determine, based at least in part on the plurality of data binding expressions, one or more dependencies between each of the plurality of data binding expressions;

generate, based at least in part on the one or more dependencies, additional source code for updating at least one respective data binding defined by the plurality of data binding expressions in response to a change to at least one property of the model object; and generate, an application comprising machine-executable code that is based at least in part on the source code of the layout file, the model object, and the additional source code.

17. The computer-readable storage medium of claim 16, comprising additional instructions that, when executed, cause the one or more processors of the computing device to determine the one or more dependencies between each of the plurality of data binding expressions by at least:

generating, based on the plurality of data binding expressions, a plurality of expression trees, wherein each expression tree from the plurality of expression trees corresponds to a particular data binding expression from the plurality of data binding expressions and defines one or more properties of the model object, one or more properties including the at least one property of the model object, that are terms of that particular data binding expression; and determining, based at least in part on the plurality of expression trees, the one or more dependencies.

18. The computer-readable storage medium of claim 17, comprising additional instructions that, when executed, cause the one or more processors of the computing device to determine the one or more dependencies between each of the plurality of data binding expressions by at least:

generating, based on the plurality of expression trees, a dependency tree that defines one or more data binding expressions from the plurality of data binding expressions that are to be evaluated before evaluating other data binding expressions from the plurality of data binding expressions; and determining, based at least in part on the dependency tree, the one or more dependencies.

19. The computer-readable storage medium of claim 16, comprising additional instructions that, when executed, cause the one or more processors of the computing device to further generate the additional source code for updating, in response to the change to the at least one property of the model object, a flag that defines changes to the at least one property of the model object.

20. The computer-readable storage medium of claim 16, comprising additional instructions that, when executed, cause the one or more processors of the computing device to further generate the additional source code for evaluating, based on the flag, each of the one or more dependencies between each of the plurality of data biding expressions by at least masking, with the flag, a respective bitmap associated with a particular binding expression from the plurality of binding expressions to determine whether to evaluate the particular binding expression, the respective bitmap defining which of the one or more dependencies is associated with that particular binding expression.

* * * * *